US012540883B2

(12) United States Patent
Crafton et al.

(10) Patent No.: US 12,540,883 B2
(45) Date of Patent: Feb. 3, 2026

(54) SYSTEM AND METHOD FOR DETECTING DAMAGE TO A TARGET OBJECT USING A SENSED SHEAR FORCE

(71) Applicant: Innovative Scientific Solutions, Inc., Dayton, OH (US)

(72) Inventors: Jimmy Wayne Crafton, Waynesville, OH (US); Nikolay V. Rogoshchenkov, Centerville, OH (US); Larry Ponde Goss, Beavercreek, OH (US); Colleen Rochelle Ryan-Crafton, Waynesville, OH (US); Michael James Lawrence, Cincinnati, OH (US); Grant Rochfort McMillan, Beavercreek, OH (US); Stephen J. Palluconi, West Chester, OH (US)

(73) Assignee: INNOVATIVE SCIENTIFIC SOLUTIONS, INC, Dayton, OH (US)

( * ) Notice: Subject to any disclaimer, the term of this patent is extended or adjusted under 35 U.S.C. 154(b) by 149 days.

(21) Appl. No.: 17/813,437

(22) Filed: Jul. 19, 2022

(65) Prior Publication Data
US 2023/0141375 A1    May 11, 2023

Related U.S. Application Data

(60) Provisional application No. 63/223,648, filed on Jul. 20, 2021.

(51) Int. Cl.
*G01M 17/02* (2006.01)
*B60C 19/00* (2006.01)

(52) U.S. Cl.
CPC ............. *G01M 17/02* (2013.01); *B60C 19/00* (2013.01); *B60C 2019/004* (2013.01)

(58) Field of Classification Search
None
See application file for complete search history.

(56) References Cited

U.S. PATENT DOCUMENTS 5,060,173 A    10/1991  Tsuji
6,381,547 B1   4/2002   Heirtzler et al.
(Continued)

FOREIGN PATENT DOCUMENTS

JP    2008107292 A    *  5/2008
JP    2014091505 A    *  5/2014
(Continued)

OTHER PUBLICATIONS

Jianchen Zhu, Kaixin Han, Shenlong Wang; Automobile tire life prediction based on image processing and maching learning technology; 13 pages; Advances in Mechanical Engineering 2021, vol. 13 (3) 1-13.
(Continued)

*Primary Examiner* — Peter J Macchiarolo
*Assistant Examiner* — Jermaine L Jenkins
(74) *Attorney, Agent, or Firm* — Shumaker, Loop & Kendrick, LLP

(57) ABSTRACT

A method of detecting damage in a target object comprises sensing a deformation and/or a force of a target object as the target object traverses a surface; comparing the sensed deformation and/or contact force of the target object to baseline data associated with an undamaged object; and detecting damage to the target object based upon the comparison of the sensed deformation and/or force of the target object to the baseline data associated with the undamaged object. A system for detecting damage comprises at least one sensor configured to sense the deformation and/or the force of the target object as the target object traverses a surface; and a controller in communication with the at least one
(Continued)

sensor, wherein the controller is configured to analyze the deformation and/or the force sensed by the at least one sensor to detect damage to the target object.

17 Claims, 23 Drawing Sheets

(56) References Cited

U.S. PATENT DOCUMENTS

| | | | | |
|---|---|---|---|---|
| 10,960,714 | B2* | 3/2021 | Decoster | B60C 23/064 |
| 11,331,964 | B2* | 5/2022 | Mori | G06T 7/62 |
| 2007/0164853 | A1 | 7/2007 | Matsuda et al. | |
| 2012/0101746 | A1 | 4/2012 | Taylor et al. | |
| 2018/0372589 | A1* | 12/2018 | Ansoud | G01L 5/165 |
| 2019/0382034 | A1* | 12/2019 | Miller | B60C 23/0488 |
| 2021/0197629 | A1 | 7/2021 | Mori | |
| 2021/0300125 | A1 | 9/2021 | Alleva et al. | |

FOREIGN PATENT DOCUMENTS

| | | | | |
|---|---|---|---|---|
| JP | 2017067550 A | * | 4/2017 | |
| KR | 20050120262 A | * | 12/2005 | B60C 25/002 |
| WO | 2021168393 A1 | | 8/2021 | |

OTHER PUBLICATIONS

Li Jinping, Hou Wendi, Han Yanbin, and Yin Jianqin; Crack Detection in Tread Area Based on Analysis of Multi-scale Singular Area; 18 pages; Institute of Pattern Recognition and Intelligent System, School of Information Science and Engineering, University of Jinan, Jinan 250022, China; Shandong Provincial Key Laboratory of Network Based Intelligent Computing, University of Jinan, Jinan 250022, China; CCCV 2015, Part II, CCIS 547, pp. 201-218, 2015; DOI: 10.1007/978-3-662-48570-5_20.

Amanda C. Kotchon, Michael G. Lipsett and David S. Nobes; Damage Detection in Tires Using Image-Based Strain Measurements; University of Alberta, Edmonton, AB T6G 1H9, Canada; Submitted: Mar. 28, 2016/Published online: May 5, 2016; 12 pages.

Meysam Khaleghian, Reza Mirzaeifar, Pooya Behroozinia, and Saied Taheri; Damage diagnosis in Intelligent tires using time-domain and frequency-domain analysis; Nov. 4, 2018; 14 pages; https://www.researchgate.net/publication/328205515.

Kristoffer B. Borgen1 and John H. Mott; Purdue University, West Lafayette, Indiana, 47906, United States of America; Jeffrey Newcamp3 and Blake Abrecht; United States Air Force Academy, Colorado, 80840, United States of America; Laser Based Commercial Aircraft Tire Condition and Damage Monitoring; 9 pages; Jan. 3-7, 2022; Copyright © 2022 by the American Institute of Aeronautics and Astronautics, Inc.

Akarsh Prabhakara, Vaibhav Singh, Swarun Kumar, and Anthony Rowe; Osprey: A mmWave Approach to Tire Wear Sensing; 14 pages; https://doi.org/10.1145/3386901.3389031.

* cited by examiner

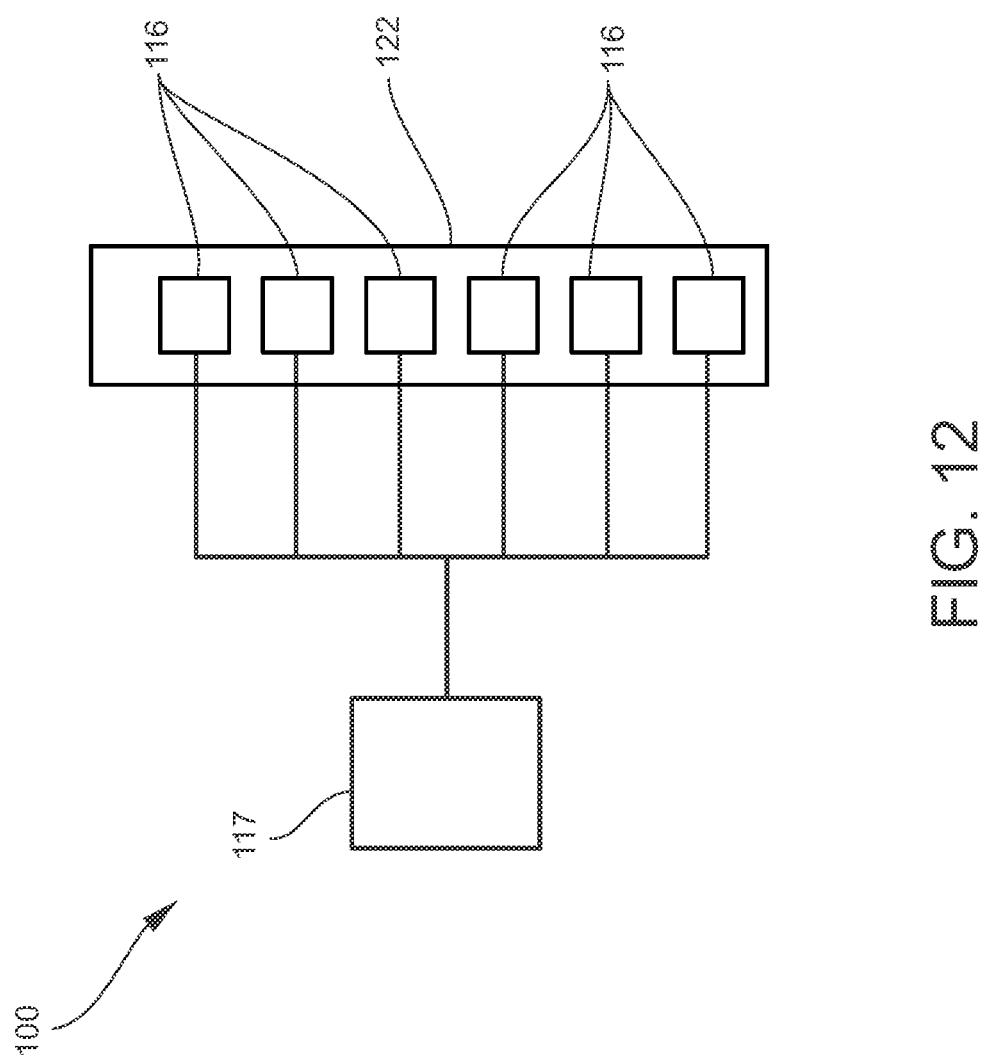

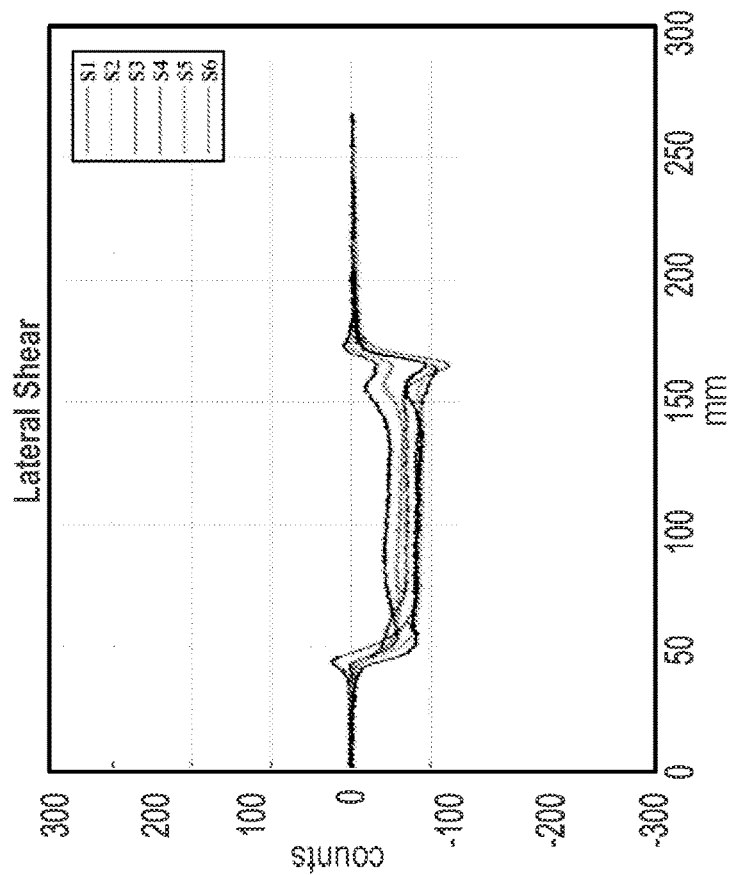
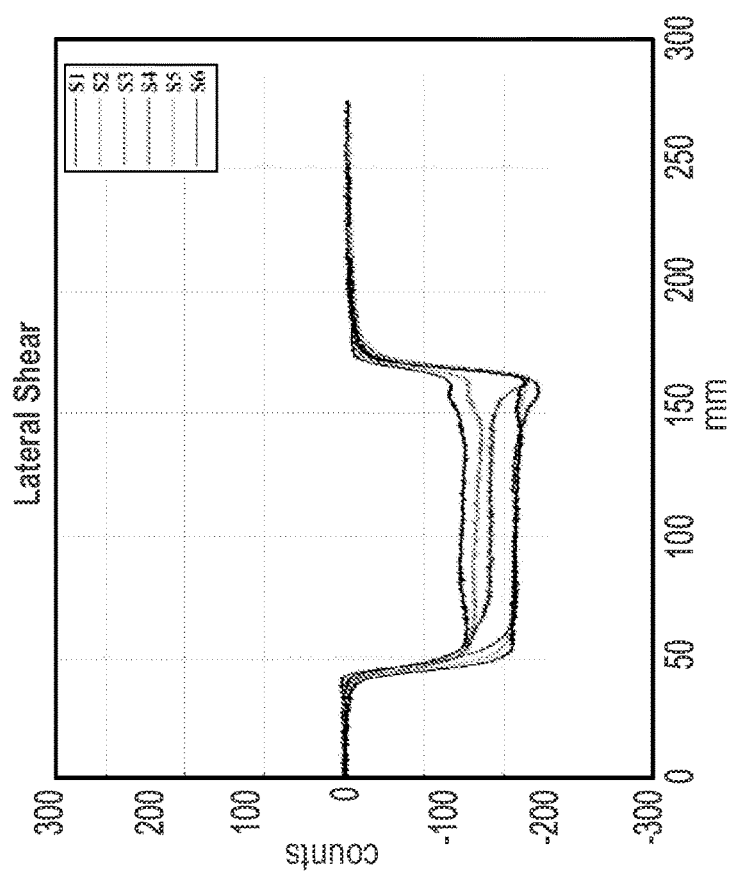

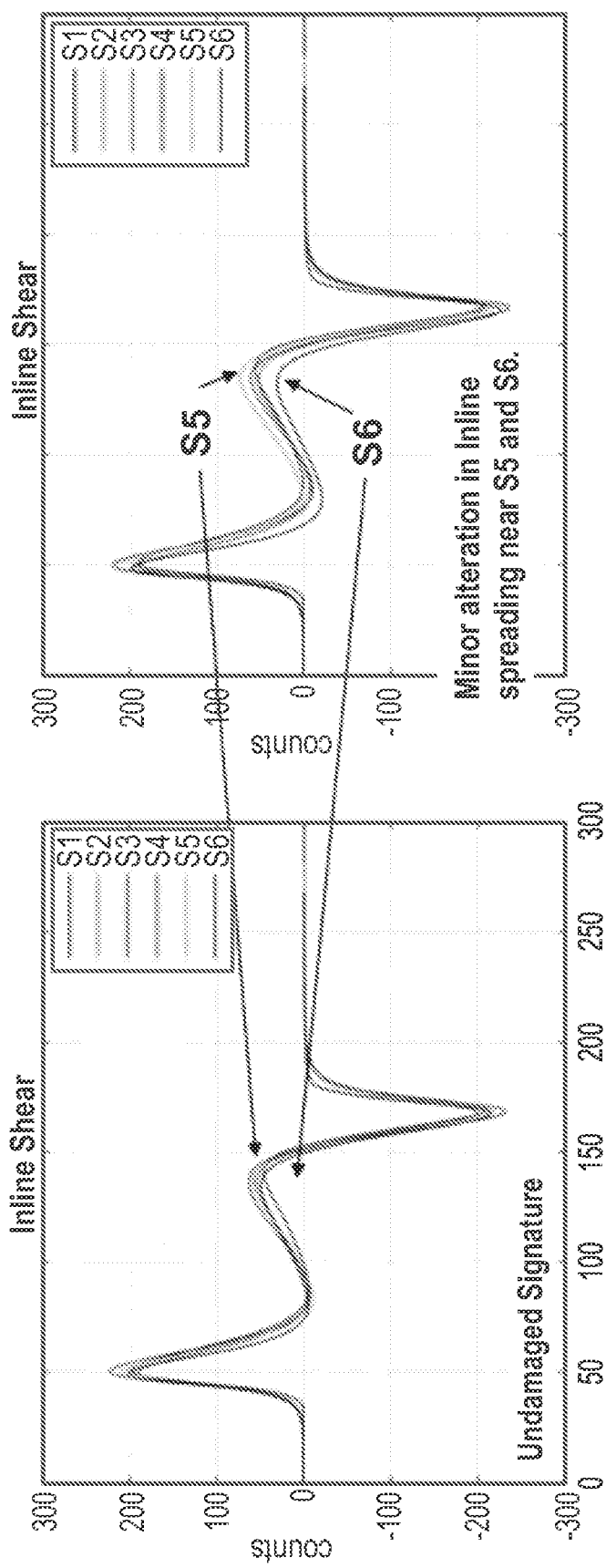

SYSTEM AND METHOD FOR DETECTING DAMAGE TO A TARGET OBJECT USING A SENSED SHEAR FORCE

CROSS-REFERENCE TO RELATED APPLICATION

This application claims the benefit of U.S. Provisional patent application Ser. No. 63/223,648, filed Jul. 20, 2021, the entirety of which is herein incorporated by reference.

FIELD

The disclosure relates to a system and method for detecting damage including external damage, cuts, punctures, and internal damage, for example, by monitoring a ground reaction force.

BACKGROUND

This section provides background information related to the present disclosure which is not necessarily prior art.

It is often desirable to detect damage to various parts or components. The damage may not always be detectable upon a visual inspection. For safety and other reasons, detection of the damage is often quite important. Further, cost savings can be realized by avoiding replacing parts or components which are not damaged.

An example of components requiring detection of damage are vehicle tires. The tread of tires is typically defined by a number of grooves or channels molded into a peripheral portion of the tire. The tread is a peripheral portion of the tire that comes into contact with the road. Tire treads give tires traction. Tire treads, however, can become damaged during the course of use. If the damage is severe enough, the tire's traction or structural integrity may be compromised, requiring the tire to be replaced.

One type of tire where it is critical to detect damage is an aircraft tire, especially military aircraft. Missions based on rapid sortie generation place a variety of demands on operational systems of military aircraft, especially tires. A need exists for automated screening procedures that ensure an integrity and a function of all aircraft systems required for mission success. For many aircraft systems, screening and alerting is handled by an autonomous logistics/onboard diagnostics system. However, these conventional systems cannot check tire integrity. Maintenance personnel can provide a fairly rapid visual confirmation of significant external tire damage such as that shown in FIG. 1. However, there is no system that can detect small-scale punctures such as those shown in FIG. 2 or internal delamination with the tire still on the aircraft in an operational state. The difficulty in detecting this damage could compromise the safety of the crew and the aircraft during future takeoffs and landings.

Accordingly, it would be desirable to develop a system and a method of detecting damage that is easily administered and detects external and/or internal damage which may or may not be detected upon a visual inspection.

SUMMARY

In concordance and agreement with the present invention, a system and a method of detecting damage that is easily administered and detects external and/or internal damage which may or may not be detectable upon a visual inspection, have surprisingly been discovered.

SUMMARY

In one embodiment, a method of detecting damage, comprises steps of: sensing a shear force as the at least one target object traverses a surface including at least one sensor; and detecting damage to the at least one target object based upon the sensed shear force.

In another embodiment, a system for detecting damage, comprises: at least one sensor configured to sense a shear force as at least one target object traverses a surface including the at least one sensor; and a controller in communication with the at least one sensor, wherein the controller is configured to analyze the shear force sensed by the at least one sensor to detect damage to the at least one target object.

In yet another embodiment, a method of detecting tire damage, comprises steps of: sensing a shear force as at least one tire traverses a surface; comparing the sensed shear force to baseline data; and detecting damage to the at least one tire based upon the comparison of the sensed shear force to the baseline data.

In some embodiments, the at least one sensor is a shear force sensor.

In some embodiments, the method further comprises a step of comparing the sensed shear force to baseline data associated with an undamaged object.

In some embodiments, the at least one target object is a tire.

In some embodiments, the damage detected includes internal damage and/or external damage to the at least one object.

In some embodiments, the at least one sensor is configured to measure a tangential shear force.

In some embodiments, the damage detected includes internal damage and external damage to the at least one target object.

In some embodiments, wherein the baseline data is generated by sensing at least one of axial shear contact force and lateral shear contact force as the undamaged object traverses a surface.

In some embodiments, the baseline data is generated by sensing an entire circumference of the undamaged object and detecting deviations from a mean.

In some embodiments, wherein the at least one target object and the undamaged object are tires used in at least one of a human-powered vehicle and a motor-powered vehicle.

In some embodiments, the at least one sensor is configured to generate a signature associated with the at least one target object.

In some embodiments, the signature associated with the at least one target object is representative of the shear force sensed by the at least one sensor.

In some embodiments, the controller is configured to compare the signature associated with the at least one target object to a signature associated with an undamaged object.

In some embodiments, the signature associated with the undamaged object is representative of a shear force as the undamaged object traverses a surface.

In some embodiments, the baseline data is generated by sensing at least one of axial shear contact force and lateral shear contact force of an undamaged tire.

In some embodiments, the baseline data is generated by sensing an entire circumference of an undamaged tire and detecting deviations from a mean.

In some embodiments, the baseline data is generated by sensing a shear force of a collection of tires used in at least one of a human-powered vehicle and a motor-powered vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 12 shows a system for detecting damage according to another embodiment of the present disclosure, wherein the system is a point-based system including an array of point sensors in communication with a controller;

FIG. 14A is a graph showing a signature associated with an undamaged tire detected using a system including an array of point sensors to sense deformation caused lateral shear forces;

FIG. 14B is a graph showing a signature associated with a tire having punctures detected using a system including an array of point sensors to sense deformation caused by lateral shear forces;

FIG. 19A is a graph showing a signature associated with an undamaged tire detected using a system including an array of point sensors to sense deformation caused inline shear forces;

FIG. 19B is a graph showing a signature associated with a tire having internal delamination detected using a system including an array of point sensors to sense deformation caused by inline shear forces;

DETAILED DESCRIPTION

Figure 1:
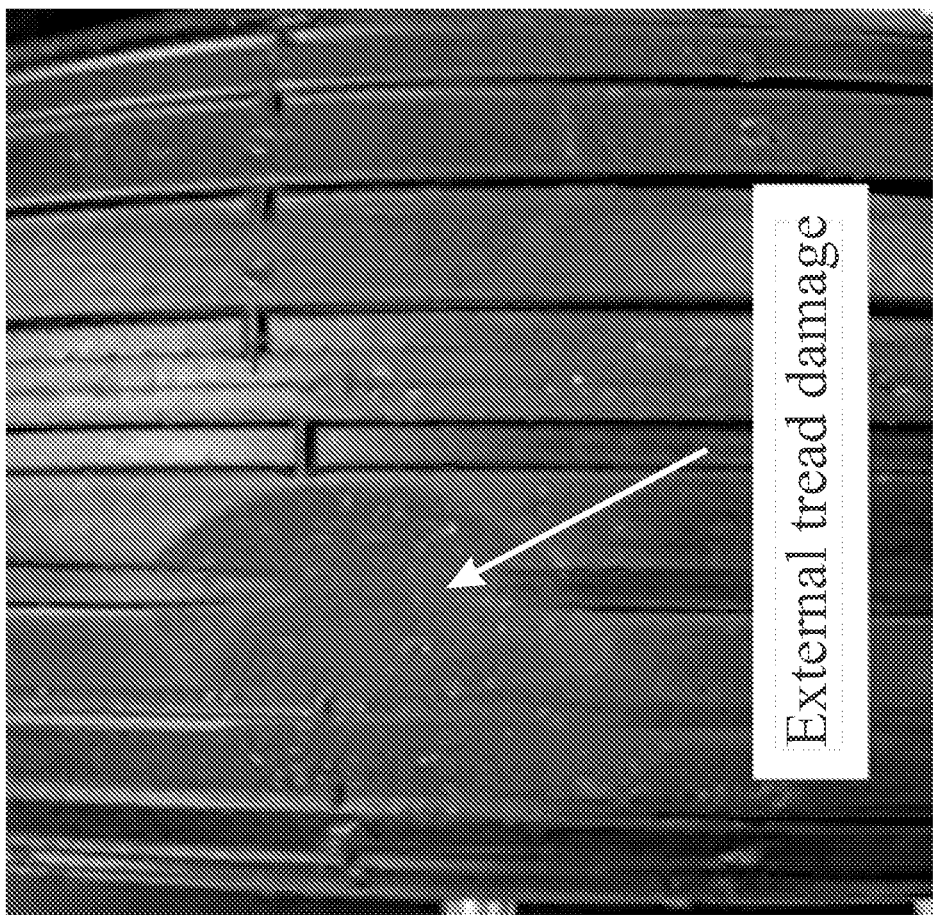
FIG. 1 is a fragmentary view of a tire having external tread damage.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of" Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9,1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Initially, it should be pointed out that although examples of detecting tire damage by sensing contact forces on a predetermined area of a surface are disclosed herein, the systems and methods disclosed may be used for detecting damage by sensing forces on other structures without departing from the scope of the invention, and the examples provided herein should not limit the scope of the disclosure in any way. Further, although various methods for sensing the contact forces to detect damage are disclosed herein, other methods and systems may be used for detecting damage by sensing deformation, contact forces, and/or reaction forces without departing from the scope of the invention, and the examples provided herein should not limit the scope of the disclosure in any way.

Figure 4:
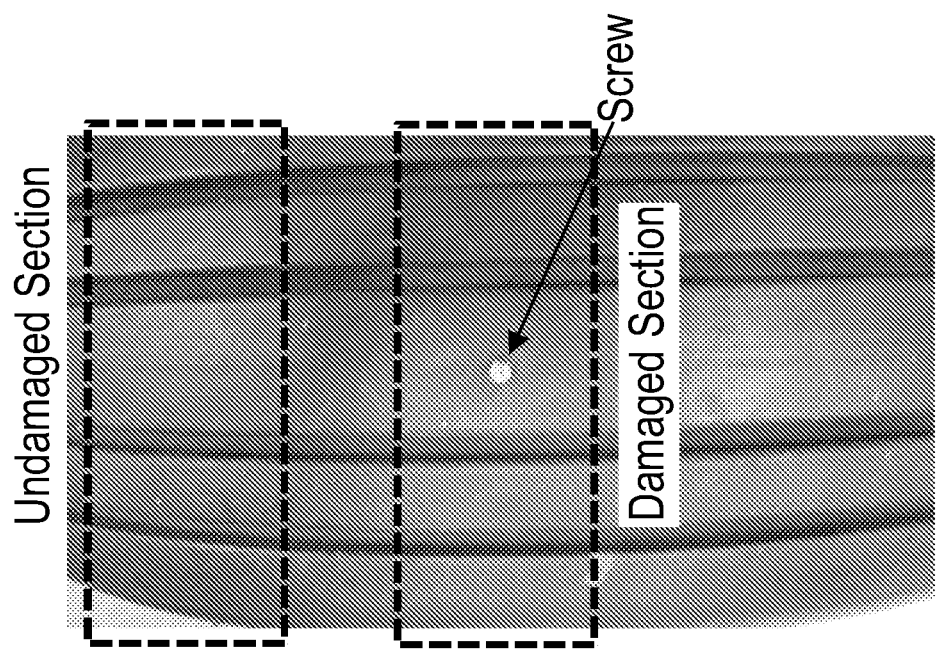
FIG. 4 is a fragmentary view of a tire having an undesired foreign object embedded therein.
Figure 3:
FIG. 3 is a fragmentary view of a tire having cuts therein.
Figure 2:
FIG. 2 is a fragmentary view of a tire having a pair of punctures therein.

FIGS. 1-4 illustrate various types of damage to a tire. In FIG. 1, for example, a tire having external tread damage is shown. An example of a tire having a pair of punctures is depicted in FIG. 2. FIG. 3 shows an example of a tire having a small cuts therein. An example of a tire having an undesired foreign objected embedded therein is shown in FIG. 4. It is understood that the types of tire damage shown in FIGS. 1-4 are non-limiting, and a tire may be subjected to and undergo various other types of damage during operation thereof.

Figure 5:
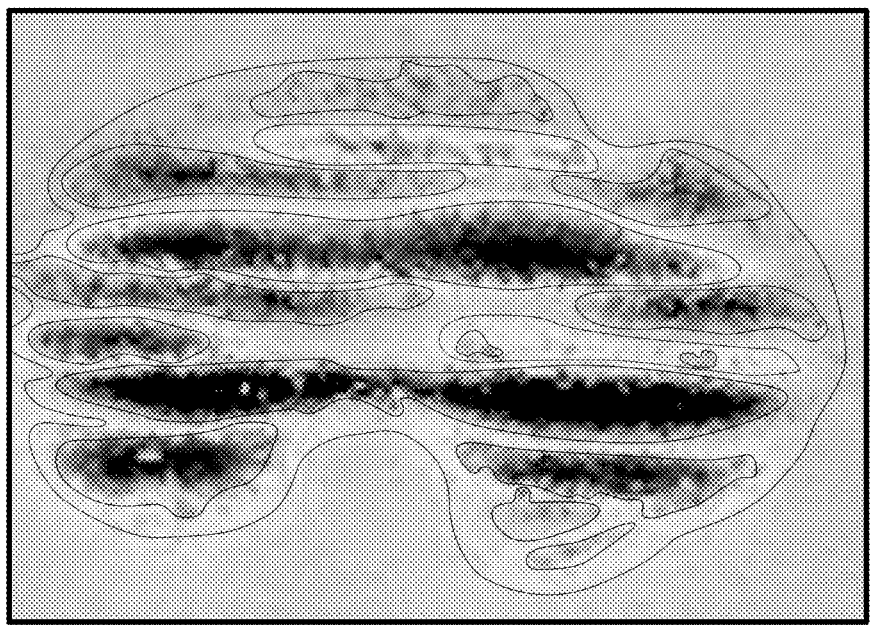
FIG. 5 is a distribution map showing differentiation of lateral deformation caused by shear forces as the tire of FIG. 1 traverses over a surface, which is used to detect the external tread damage.
Figure 6:
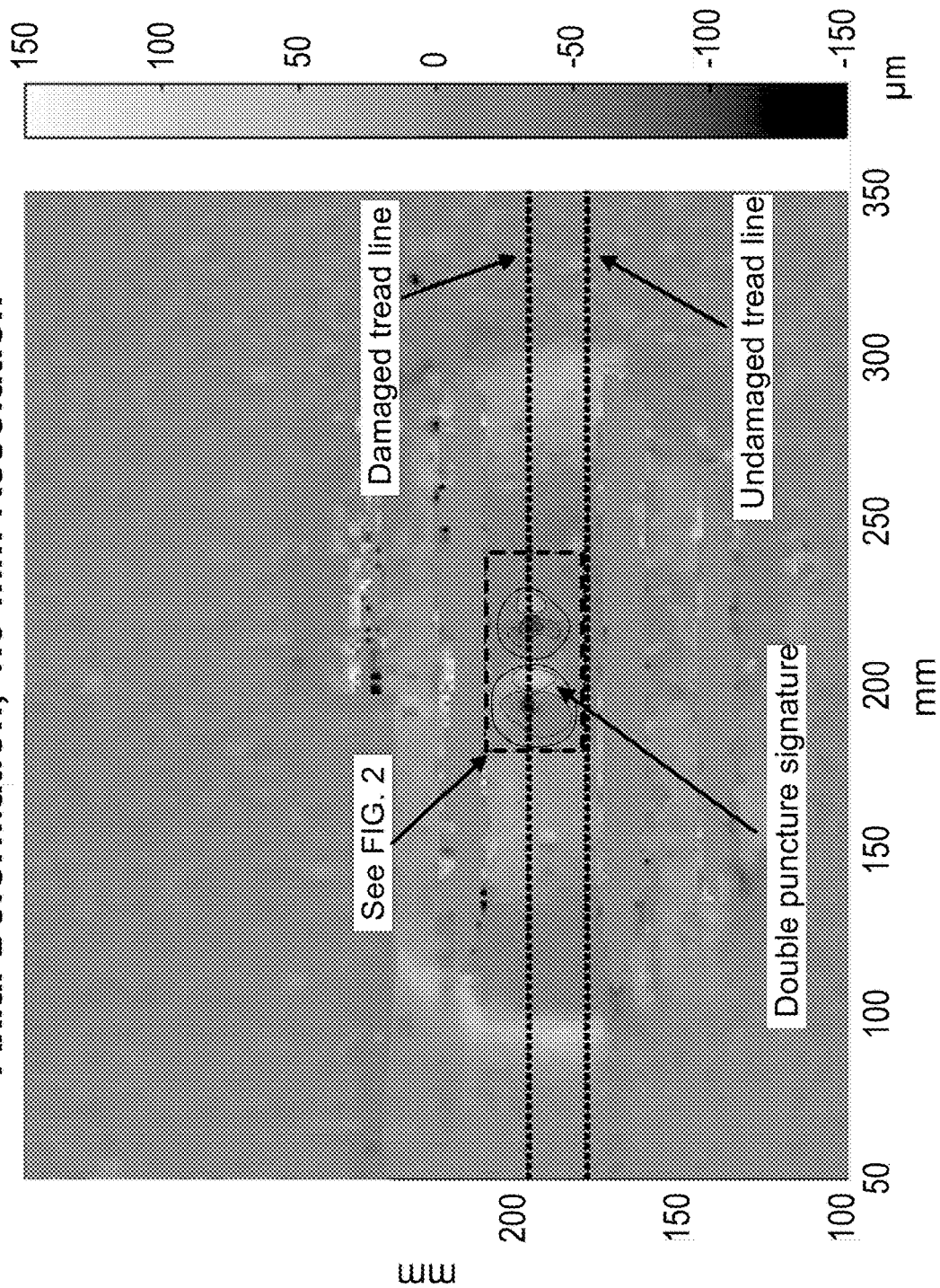
FIG. 6 is a distribution map showing differentiation of axial deformation caused by shear forces as the tire of FIG. 2 traverses over a surface, which is used to detect the punctures in the tire.
Figure 7:
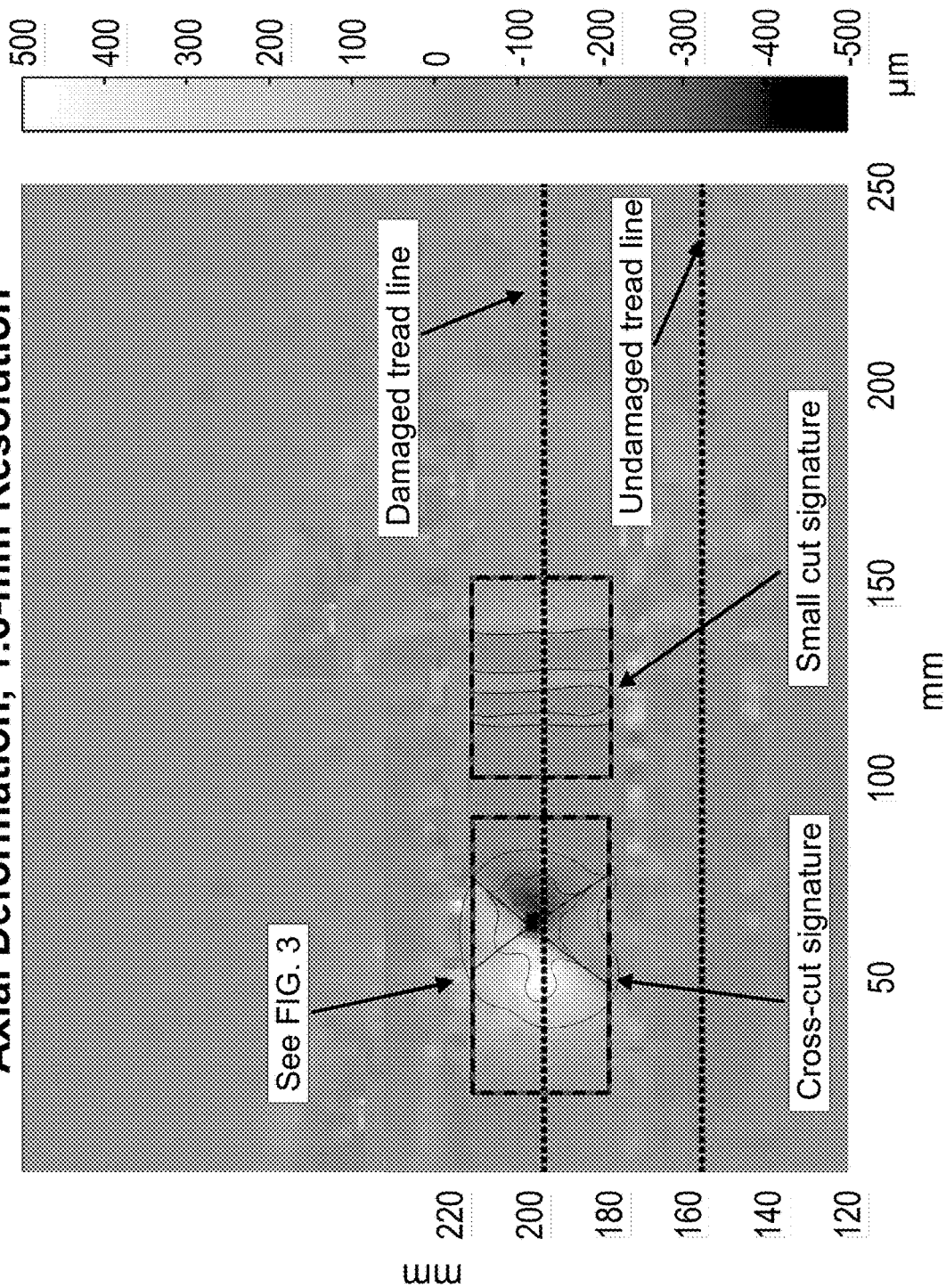
FIG. 7 is a distribution map showing differentiation of axial deformation caused by shear forces as the tire of FIG. 3 traverses over a surface, which is used to detect the cuts in the tire.
Figure 8:
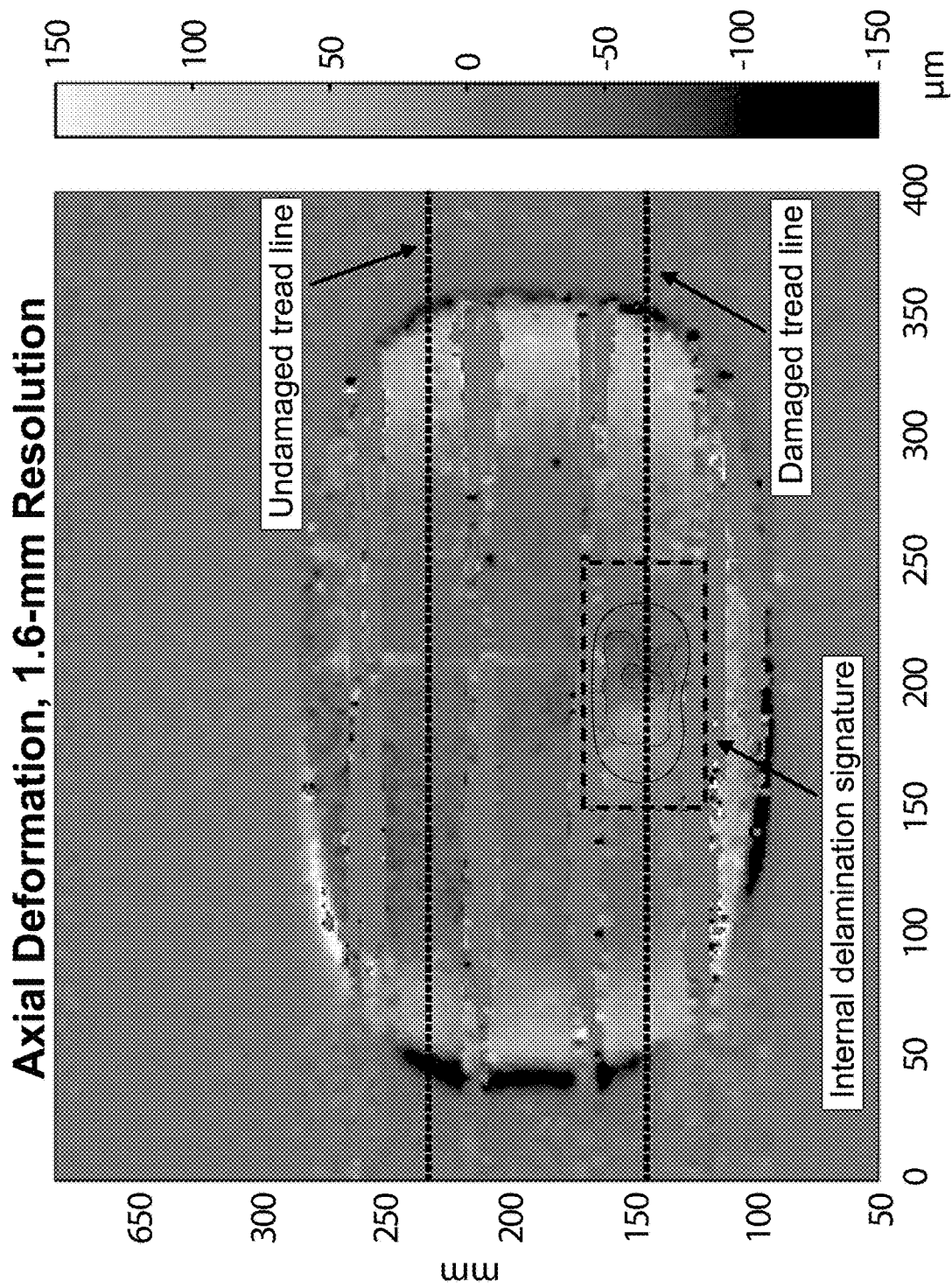
FIG. 8 is a distribution map showing differentiation of axial deformation caused by shear forces as a tire traverses over a surface, which is used to detect internal damage to the tire.

Further, FIGS. 5-8 show respective depictions of deformation patterns caused by contact forces which provide unique signatures representative of damage to the tire. More particularly, referring now to FIGS. 5-7, which are distribution maps showing differentiation of axial deformation caused by shear forces as the tires of FIGS. 1-3, respectively, traverse over a surface to detect external tire damage. FIG. 8 is a distribution map showing differentiation of axial deformation caused by shear forces as a tire having internal damage (e.g., delamination) traverses over a surface. Accordingly, the external damage and the internal damage may be detected by analyzing the axial deformation patterns of FIGS. 5-8 caused by the shear forces as the tires traverse the surface. In FIG. 5, the external damage in the form of tread wear is shown with the lateral deformation pattern associated therewith. In FIG. 6, the external damage in the form of two punctures is shown with the axial deformation pattern associated therewith. In FIG. 7, the external damage in the form of small cuts is shown with the axial deformation pattern associated therewith. In FIG. 8, the internal damage is shown with the axial deformation pattern associated therewith. The deformation patterns associated with the various damage types may then be compared to deformation patterns associated with an undamaged tire or undamaged areas of the same tire to detect whether damage to a tire exists and what type of damage there is to the tire. Thus, various damage types to the tire may be detected using the deformation signatures caused by various contact and/or reaction forces, thus allowing for corrective action to be taken. It is understood that the various contact forces may include frictional, tension, normal, tangential, and/or shear forces applied to the surface.

Various systems and methods of obtaining deformation and/or force data for at least one target object will now be discussed.

Figure 11:
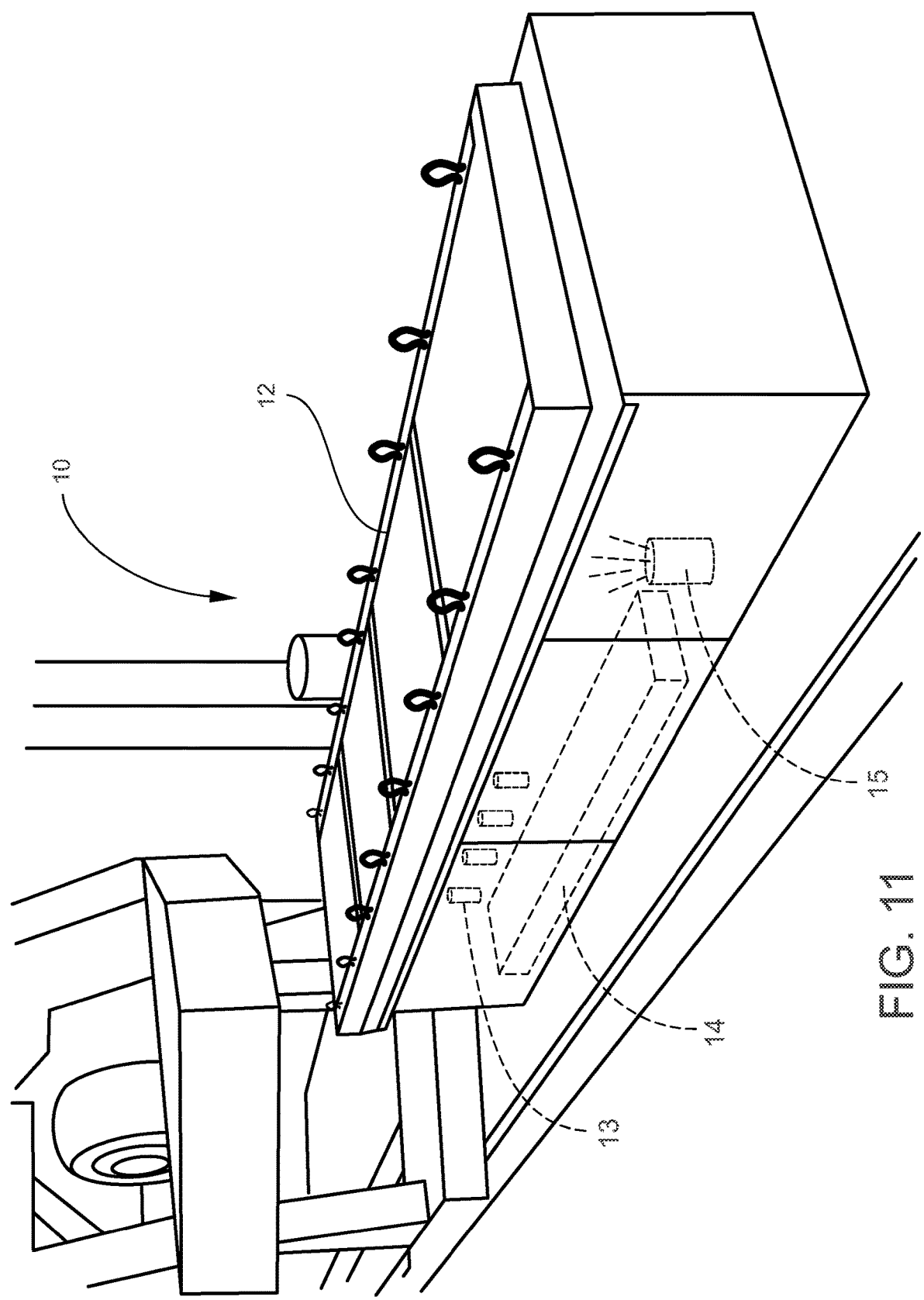
FIG. 11 shows a system for detecting damage according to an embodiment of the present disclosure, wherein the system is an image-based system including a surface stress sensitive film, at least one sensor, at least one illumination device, and a controller.

An image-based system 10 for sensing and/or measuring the deformation, the contact forces, and/or the reaction forces over a predetermined area of a surface to detect damage to the at least one target object (e.g. the tire) in accordance with an embodiment of the present disclosure is shown in FIG. 11. In a non-limiting example, the system 10 may provide continuous measurements of deformation caused by the contact forces (e.g. the shear forces) under fully-loaded aircraft tires undergoing free rolling, yawing, and braking maneuvers. The primary goal of such system 10 is to provide high-resolution experimental measurements of tire contact forces for advancement of tire wear models.

In some embodiments, the system 10 may include a surface-stress-sensitive film (S3F) 12, at least one sensor 13 (e.g. a camera), a controller 14, and at least one illumination device 15 (e.g. an light-emitting diode (LED)). The at least one sensor 13 may be configured to produce the deformation patterns illustrated in FIGS. 5-8. An example of an S3F is disclosed in commonly owned U.S. Pat. No. 7,127,950, hereby incorporated herein by reference in its entirety. Inspection of an entire tire, with spatial resolution on the order of 2-mm, is accomplished by rolling a tire over a length of the S3F 12. Testing conducted on tires having damage that is not readily identified visually, such as the punctures shown in FIG. 2, the cuts shown in FIG. 3, the embedded foreign object shown in FIG. 4, and internal delamination, for example, demonstrated that the damage may be detected by sensing and/or measuring the deformation caused by the contact forces over a predetermined surface provided by the S3F 12. Thus, in a non-limiting example, merely maneuvering an aircraft such that the tires of the aircraft are driven over the system 10, field tire damage information may be obtained.

Figure 9:
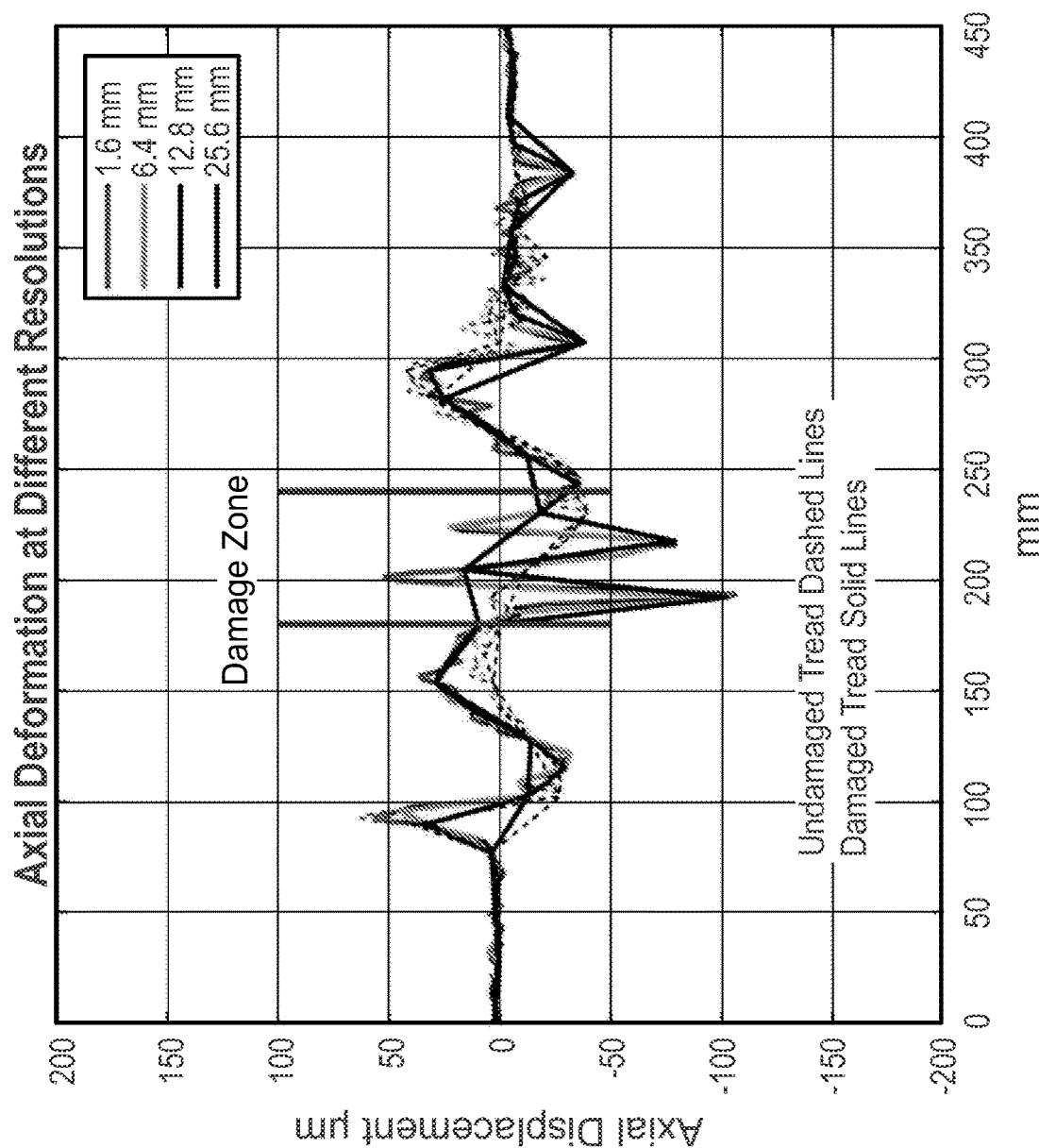
FIG. 9 is a graph demonstrating external damage detection by comparing axial deformation at a range of spatial resolutions of the tire with cuts and an undamaged tire.
Figure 10:
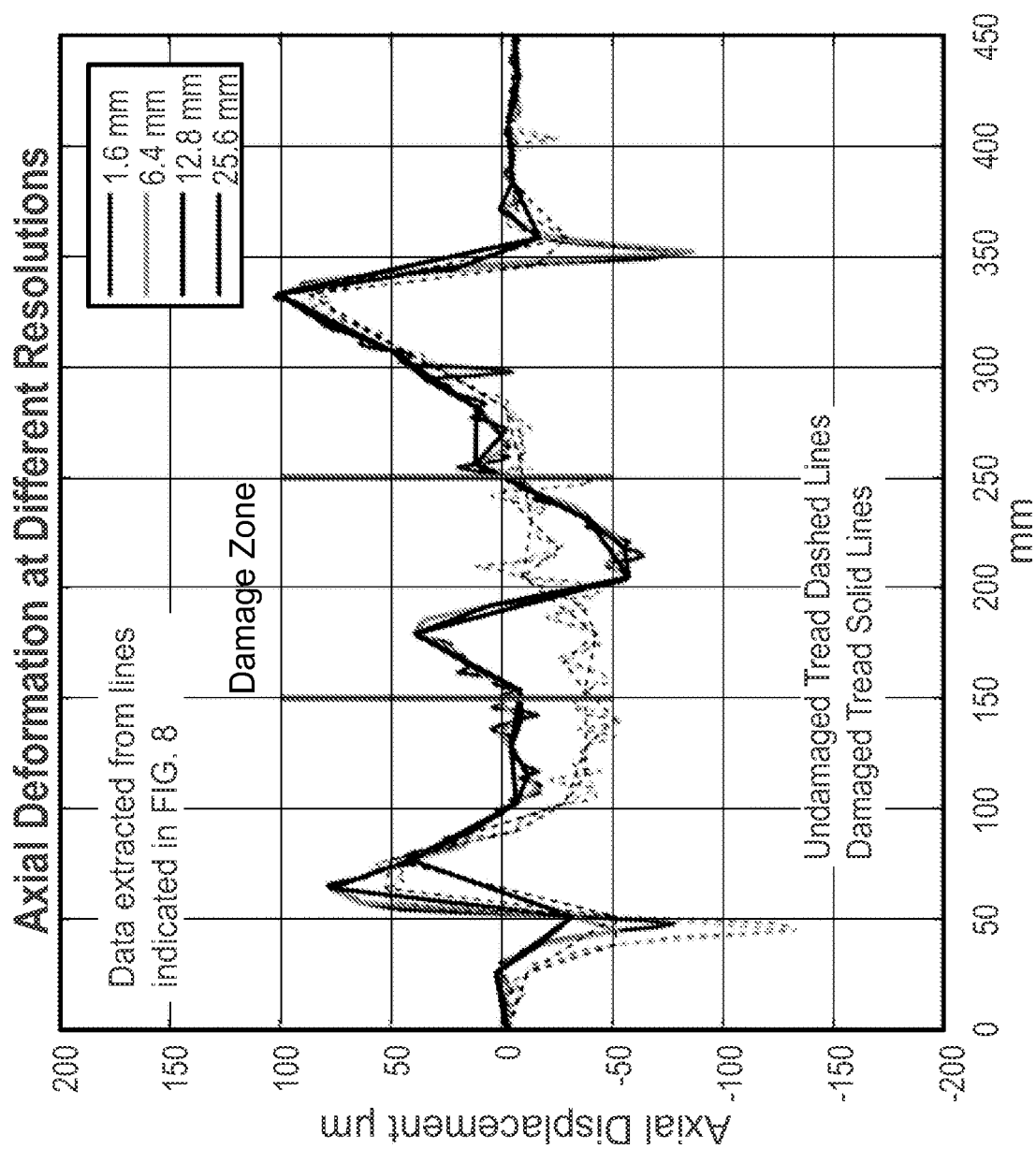
FIG. 10 is a graph demonstrating internal damage detection by comparing axial deformation at a range of spatial resolutions of the tire with internal delamination and an undamaged tire.

It was recognized that a spatial resolution of the image-based system 10 may be quite high relative to a footprint of the deformation caused by the contact forces in the predetermined surface. The results from testing the tires shown in FIGS. 1-4 indicate that a system 10 with spatial resolution on an order of 20 mm is sufficient to detect both the external damage of the tire as shown in FIG. 9 and the internal damage of the tire as shown in FIG. 10. Since the spatial resolution required to detect damage to the tire is relatively high, other systems for sensing and/or measuring the deformation, the contact forces, and/or the reaction forces may be used.

In some embodiments, the system 10 may be configured to collect data on an entirety of the target object such as a circumference of the tire, for example. See FIGS. 9 and 10. More preferably, this system 10 may be configured to sense the deformation caused by the contact forces to detect damage to the tire such as the tire damage shown in FIGS. 1-4, for example. While external large-scale damage such as that shown in FIG. 1 can easily be identified visually, small-scale damage such as the punctures shown in FIG. 2 and the cuts shown in FIG. 3 can be more difficult to detect visually. As illustrated in FIG. 9, a damaged tire produces a distinct pattern of deformation in its signature that can be readily distinguished from baseline data of an undamaged tire. Furthermore, internal damage, such as the internal delamination, also produces distinct patterns of deformation in its signature that can be readily distinguished from baseline data of an undamaged tire as shown in FIG. 10. In certain embodiments, a comparison of the signatures of the damaged tires against the baseline data of the undamaged tires may be conducted by the system 10 using automated software via the controller 14.

It was further found that the deformation pattern caused by the tire damage, such as that shown in FIGS. 1-4, is relatively large compared to a size of the actual defect. A spatial resolution of the image-based system 10, on the order of 2 mm, may be excessive compared to a spatial resolution needed to detect tire damage. Accordingly, the detection of damage using deformation at a series of spatial resolutions was employed by the system 10. In FIGS. 9 and 10, the deformation of each of the undamaged tire and the damaged tires at various spatial resolutions is decimated and plotted. More particularly, the deformation of the undamaged tire and the deformation of the damaged tire shown in FIG. 3 at spatial resolutions from 1.6 mm to 25.6 mm are decimated and plotted in FIG. 9. In FIG. 10, the deformation of the undamaged tire and the deformation of the damaged tire having internal delamination at spatial resolutions from 1.6 mm to 25.6 mm are decimated and plotted. A sharp change in the deformation around the internal delamination at approximately 190 mm is clearly visible in the associated signature of the damaged tire, even at a spatial resolution of 25 mm. However, this feature is absent in the signature of the undamaged tire. The recognition that the spatial resolution necessary to detect meaningful damage may be on the order of 25 mm also suggests that various other systems for detecting damage may be employed.

FIG. 12 depicts a point-based the system 100 for detecting damage to at least one target object in accordance with another embodiment of the present disclosure. The system 100 may include a plurality of sensors 116 in communication with a controller 117 to detect damage to the at least one target object. For example, the system 100 may comprise a linear array of the sensors 116 integrated into at least one plate 122. It is understood that the plate 122 may be a modular plate and produced from any suitable material such as acrylic, for example. Various types of sensors 116 may be employed in the system 100 as desired.

Examples illustrated in FIGS. 13A-20B indicate that the system 100 comprising an array of the sensors 116 may be used to detect tire damage. In the testing examples, the system 100 in accordance with the particular embodiment shown in FIG. 12 was used. Such embodiment of the system 100 includes a linear array of sensors 116 produced by cutting a channel into an acrylic plate 122 and integrating a series of six sensors 116 placed at 1-inch intervals. Such system 100 was then installed in a tire force machine and testing was conducted using an undamaged tire and the damaged tires of FIGS. 1-4. The system 100 was placed in-line with the undamaged tire so that a continuous undamaged section of the tire rolled over the system 100. A displacement caused by the contact forces (e.g. an inline shear force and a lateral shear force) of the undamaged tire rolling over the system 100 was sampled in time resulting in a signature associated with the undamaged tire. The system 100 was also placed in-line with the damaged tire so that an undamaged section and a damaged section of the tire rolled over the system 100. A displacement caused by the contact forces (e.g. an inline shear force and a lateral shear force) of the damaged tire rolling over the system 100 was sampled in time resulting in a signature associated with the damaged tire. The signature associated with the damaged tire was then compared, via the controller 117, to the signature associated with the undamaged tire for each separate type of contact force to detect tire damage. In certain embodiments, a comparison of the signatures of the damaged tires against the baseline data of the undamaged tires may be conducted by the system 100 using automated software via the controller 117.

Figure 13A:
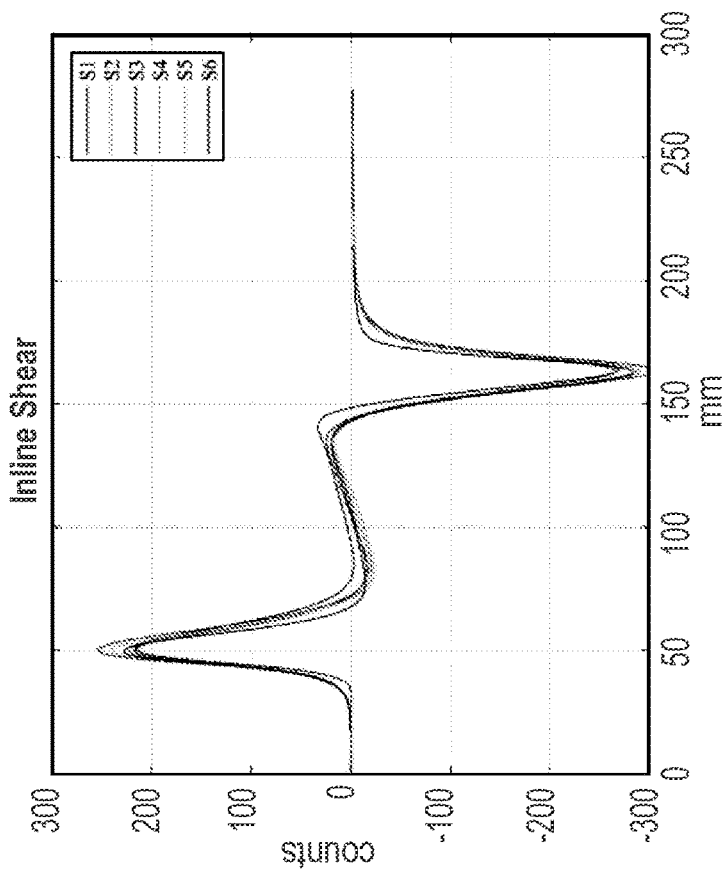
FIG. 13A is a graph showing a signature associated with an undamaged tire detected using a system including an array of point sensors to sense deformation caused inline shear forces.
Figure 13B:
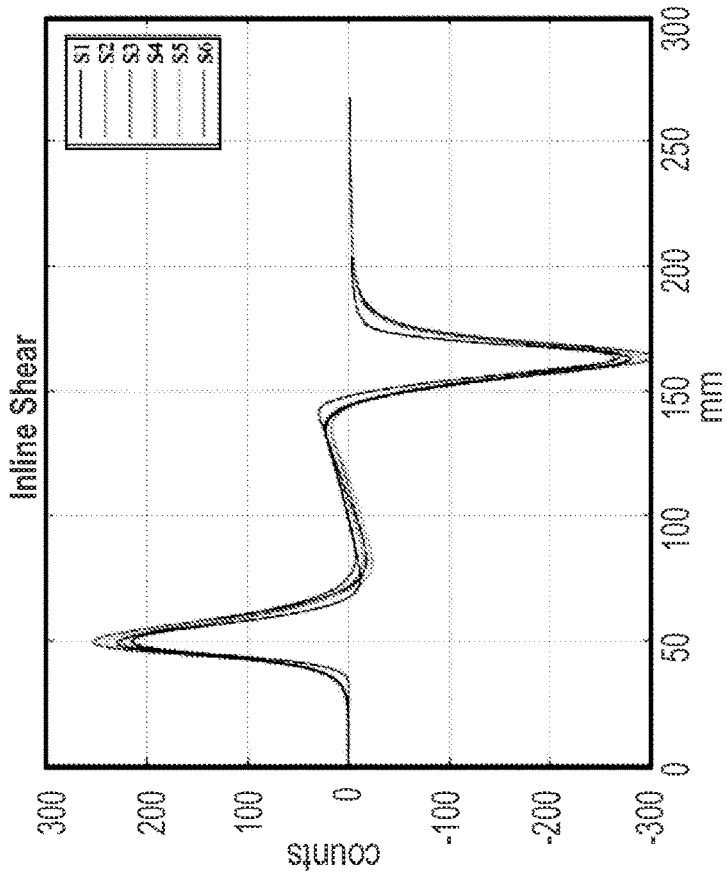
FIG. 13B is a graph showing a signature associated with a tire having punctures detected using a system including an array of point sensors to sense deformation caused by inline shear forces.

Resulting signatures of the tire with the punctures are presented in FIGS. 13A, 13B, 14A, 14B. Uncalibrated data from each of the sensors 16 of the system 100 for inline shear force and lateral shear force of the undamaged tire is shown in FIGS. 13A and 14A, respectively. Comparable uncalibrated data from each of the sensors 16 of the system 100 for inline shear force and lateral shear force of the damaged tire is shown in FIGS. 13B and 14B, respectively. A comparison of the signatures for inline shear force provides no clear evidence of tire damage. However, there is an obvious deviation in the signature associated with the damaged tire for lateral shear force, particularly at a fifth one (S5) of the sensors 16 as lateral spreading of the damaged tire decreased.

Figure 15B:
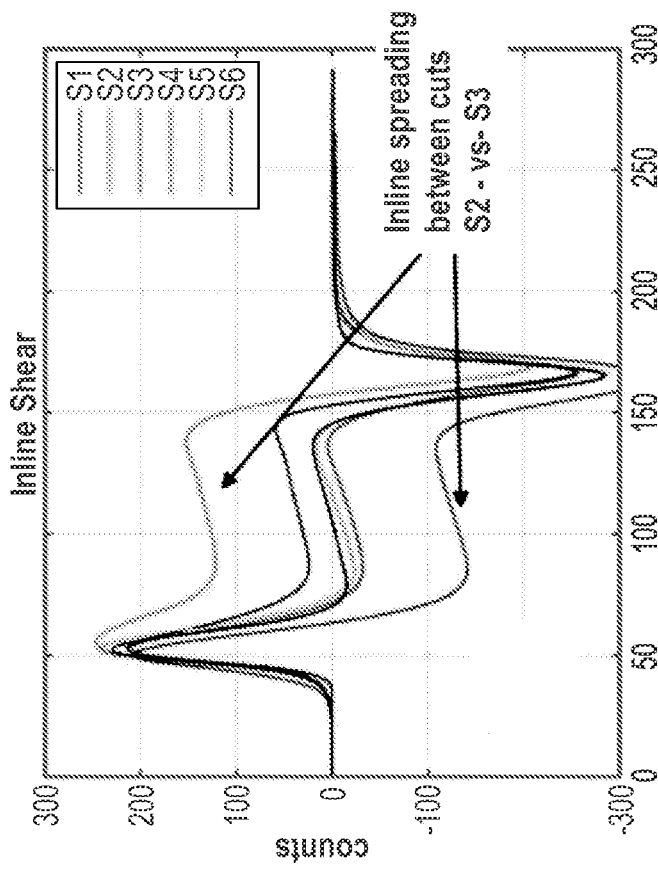
FIG. 15B is a graph showing a signature associated with a tire having cuts detected using a system including an array of point sensors to sense deformation caused by inline shear forces.
Figure 15A:
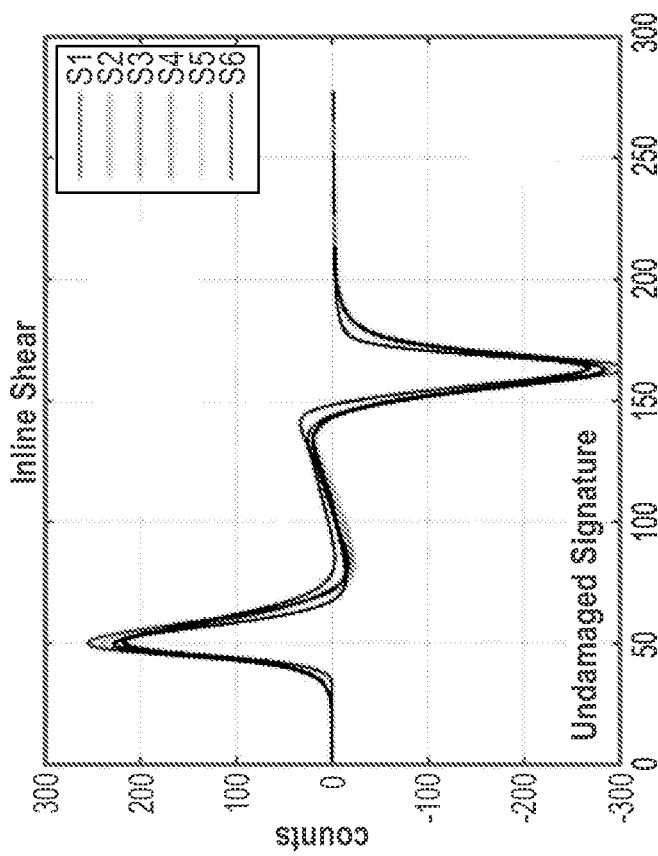
FIG. 15A is a graph showing a signature associated with an undamaged tire detected using a system including an array of point sensors to sense deformation caused inline shear forces.
Figure 16B:
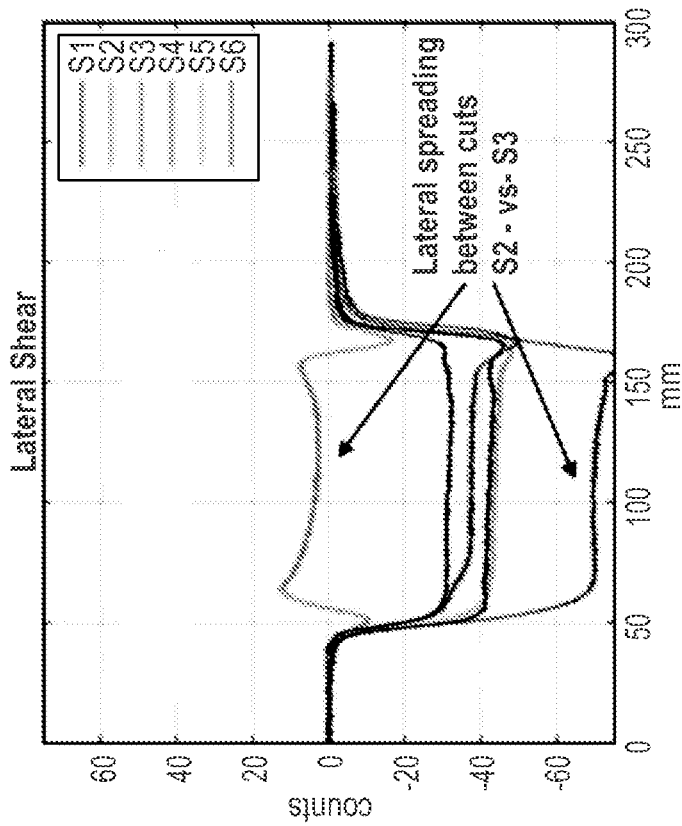
FIG. 16B is a graph showing a signature associated with a tire having cuts detected using a system including an array of point sensors to sense deformation caused by lateral shear forces.
Figure 16A:
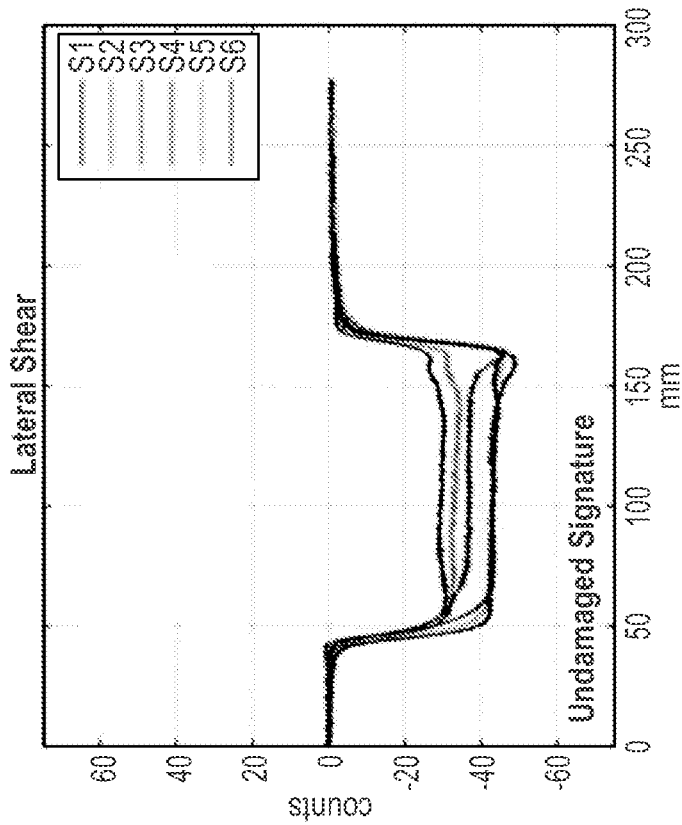
FIG. 16A is a graph showing a signature associated with an undamaged tire detected using a system including an array of point sensors to sense deformation caused lateral shear forces.

Resulting signatures of the tire with the cuts are presented in FIGS. 15A, 15B, 16A, 16B. Uncalibrated data from each of the sensors 16 of the system 100 for inline shear force and lateral shear force of the undamaged tire is shown in FIGS. 15A and 16A, respectively. Comparable uncalibrated data from each of the sensors 16 of the system 100 for inline shear force and lateral shear force of the damaged tire is shown in FIGS. 15B and 16B, respectively. A comparison of the signatures for both inline shear force and lateral shear force provides clear evidence of tire damage. There is an obvious deviation in the signature associated with the damaged tire for inline shear force between a second one (S2) and a third one (S3) of the sensors 16 as the damaged tire spreads around the cuts. A similar deviation is present in the signature associated with the damaged tire for lateral shear force between S2 and S3.

Figure 17A:
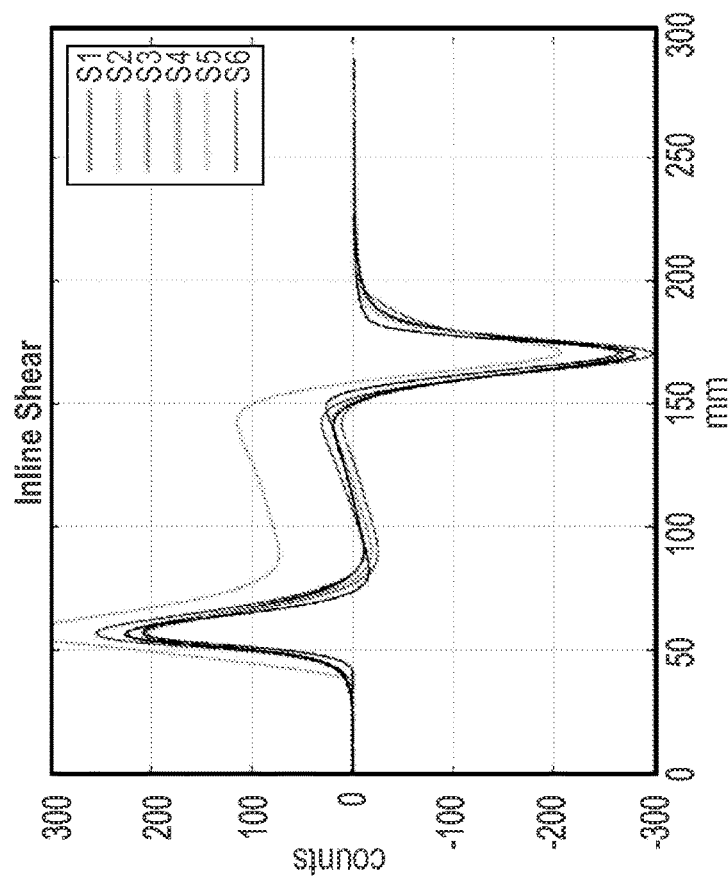
FIG. 17A is a graph showing a signature associated with an undamaged tire detected using a system including an array of point sensors to sense deformation caused inline shear forces.
Figure 17B:
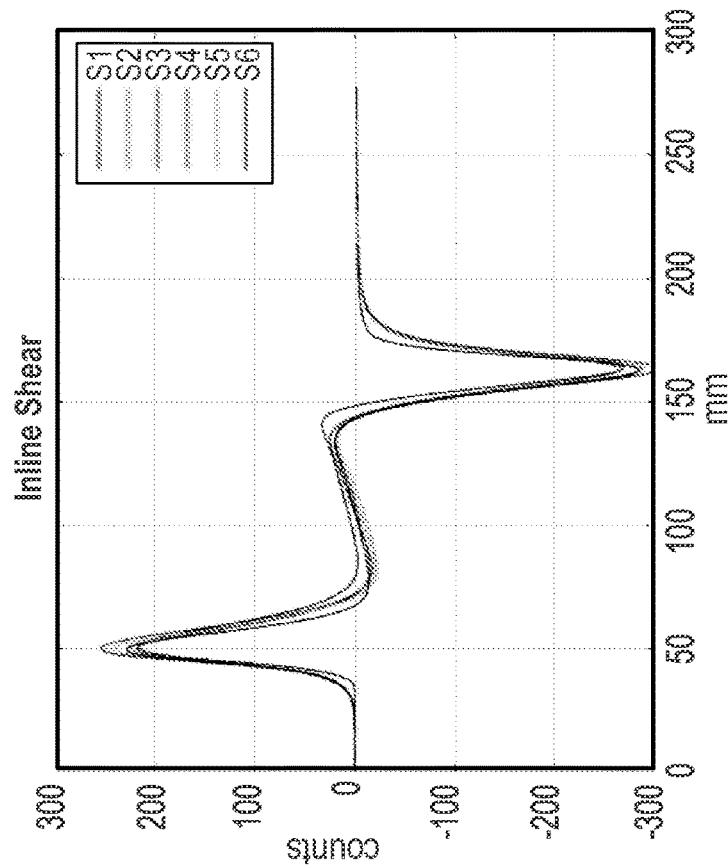
FIG. 17B is a graph showing a signature associated with a tire having an embedded foreign object detected using a system including an array of point sensors to sense deformation caused by inline shear forces.
Figure 18B:
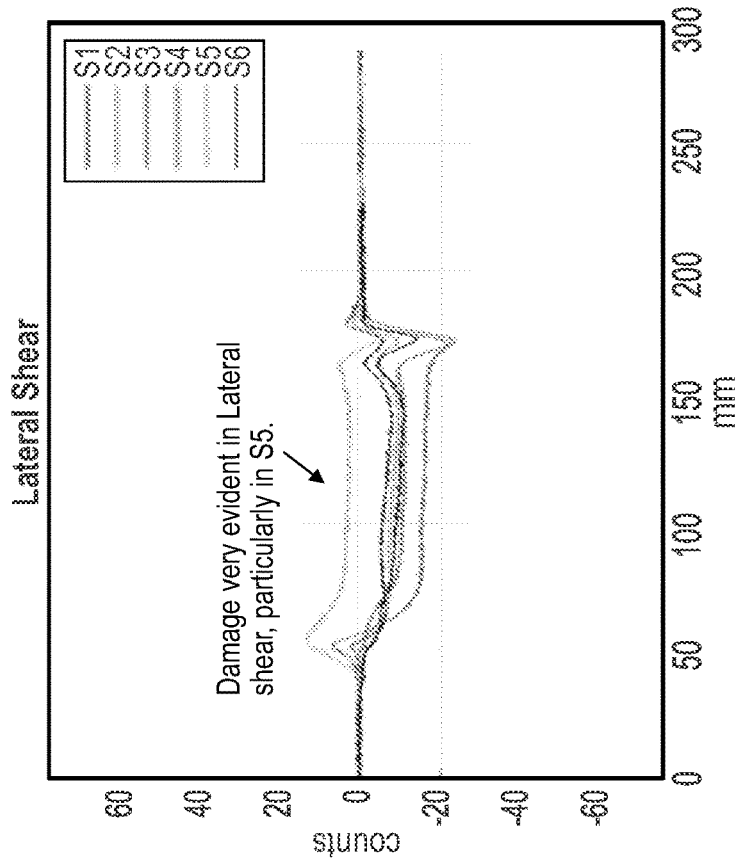
FIG. 18B is a graph showing a signature associated with a tire having an embedded foreign object detected using a system including an array of point sensors to sense deformation caused by lateral shear forces.
Figure 18A:
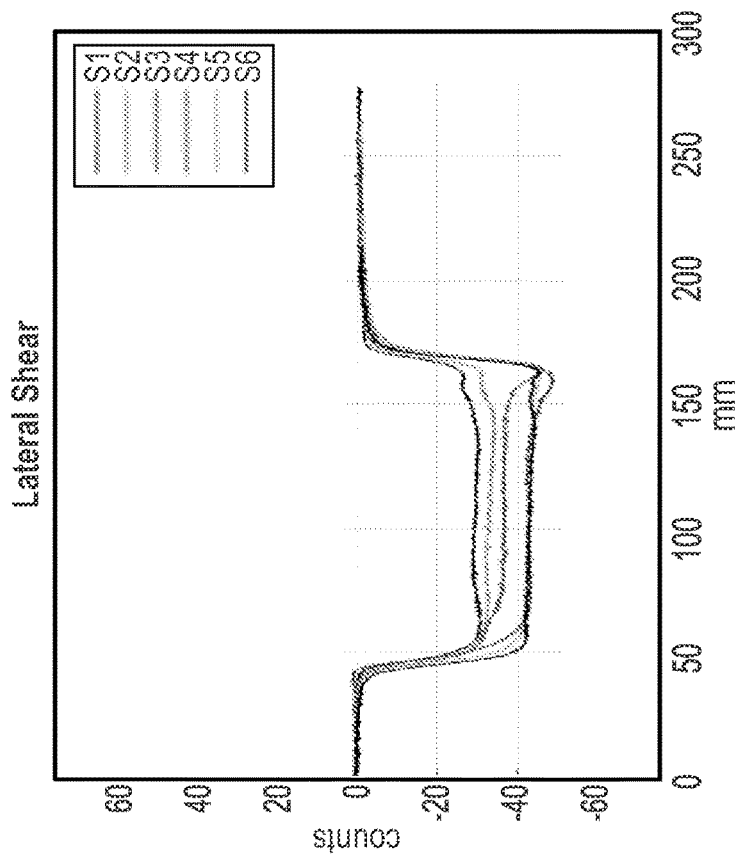
FIG. 18A is a graph showing a signature associated with an undamaged tire detected using a system including an array of point sensors to sense deformation caused lateral shear forces.

Resulting signatures of the tire with the embedded foreign object are presented in FIGS. 17A, 17B, 18A, 18B. Uncalibrated data from each of the sensors 16 of the system 100 for inline shear force and lateral shear force of the undamaged tire is shown in FIGS. 17A and 18A, respectively. Comparable uncalibrated data from each of the sensors 16 of the system 100 for inline shear force and lateral shear force of the damaged tire is shown in FIGS. 17B and 18B, respectively. A comparison of the signatures for both inline shear force and lateral shear force provides clear evidence of tire damage. There is an obvious deviation in the signature associated with the damaged tire for inline shear force, particularly at S5. Further, obvious deviations in the signature associated with the damaged tire for the lateral shear force are present at all of the sensors 116, and more pronounced at S5.

Figure 20A:
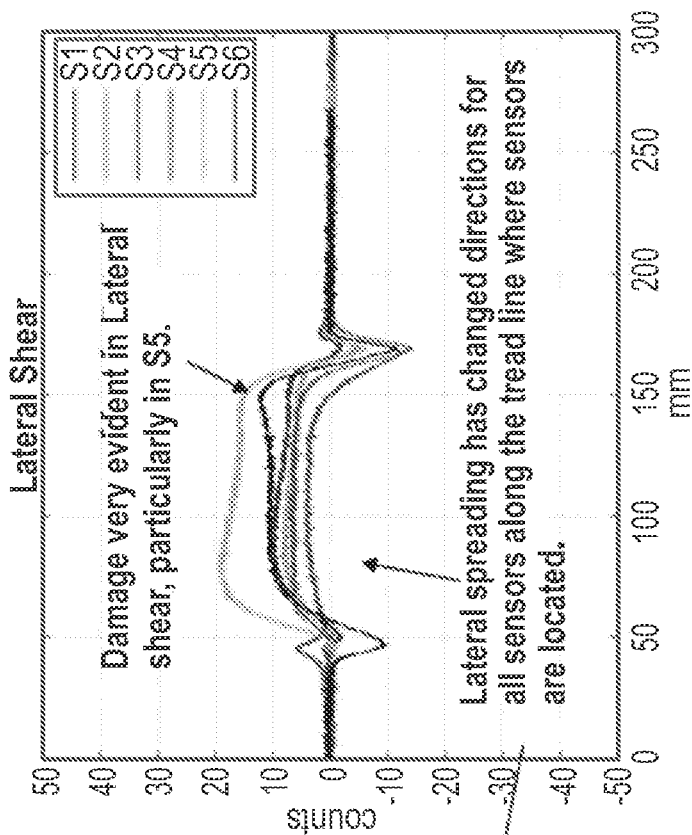
FIG. 20A is a graph showing a signature associated with an undamaged tire detected using a system including an array of point sensors to sense deformation caused lateral shear forces.
Figure 20B:
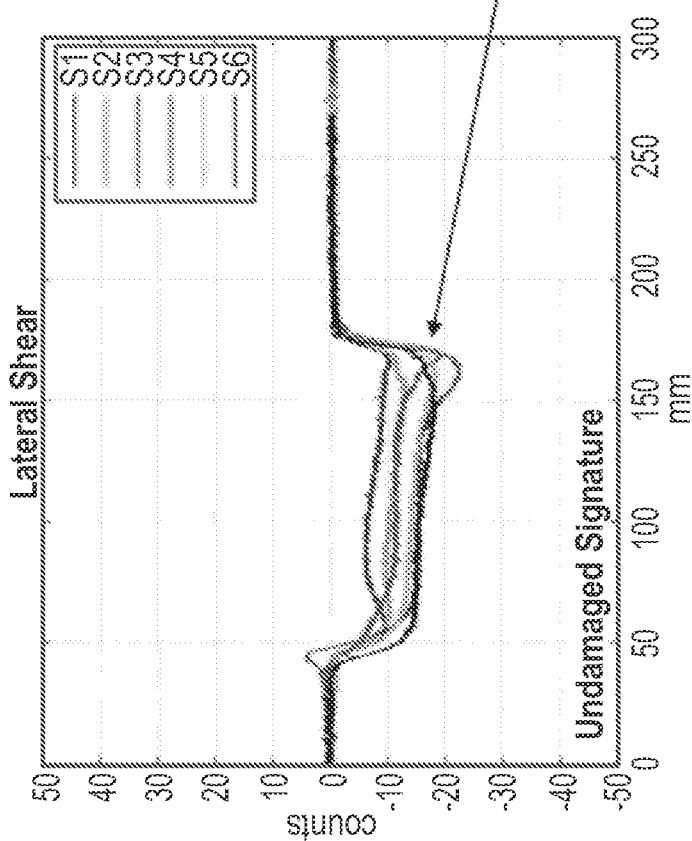
FIG. 20B is a graph showing a signature associated with a tire having internal delamination detected using a system including an array of point sensors to sense deformation caused by lateral shear forces.

Resulting signatures of the tire with the internal delamination are presented in FIGS. 19A, 19B, 20A, 20B. Uncalibrated data from each of the sensors 16 of the system 100 for inline shear force and lateral shear force of the undamaged tire is shown in FIGS. 19A and 20A, respectively. Comparable uncalibrated data from each of the sensors 16 of the system 100 for inline shear force and lateral shear force of the damaged tire is shown in FIGS. 19B and 20B, respectively. A comparison of the signatures for both inline shear force and lateral shear force provides evidence of tire damage. In this case, the presence of the tire damage is more subtle for the inline shear force. There is a minor deviation in the signature associated with the damaged tire for inline shear force, indicating spreading near S5 and S6. However, the presence of the damage is quite obvious for the lateral shear force, where a sign of the lateral shear force for all the sensors 16 has changed direction. There are obvious deviations in the signature associated with the damaged tire for the lateral shear force, indicating spreading at all of the sensors 16, particularly at S5.

These examples indicate that deformation caused by the contact forces deviates noticeably from mean baseline data associated with the undamaged tire in the presence of tire damage. Accordingly, even without calibration, the presence and location of the tire damage may be detected by the system 100 using a comparison of the signatures associated with damaged tire to the signatures associated with the undamaged tire.

Figure 21:
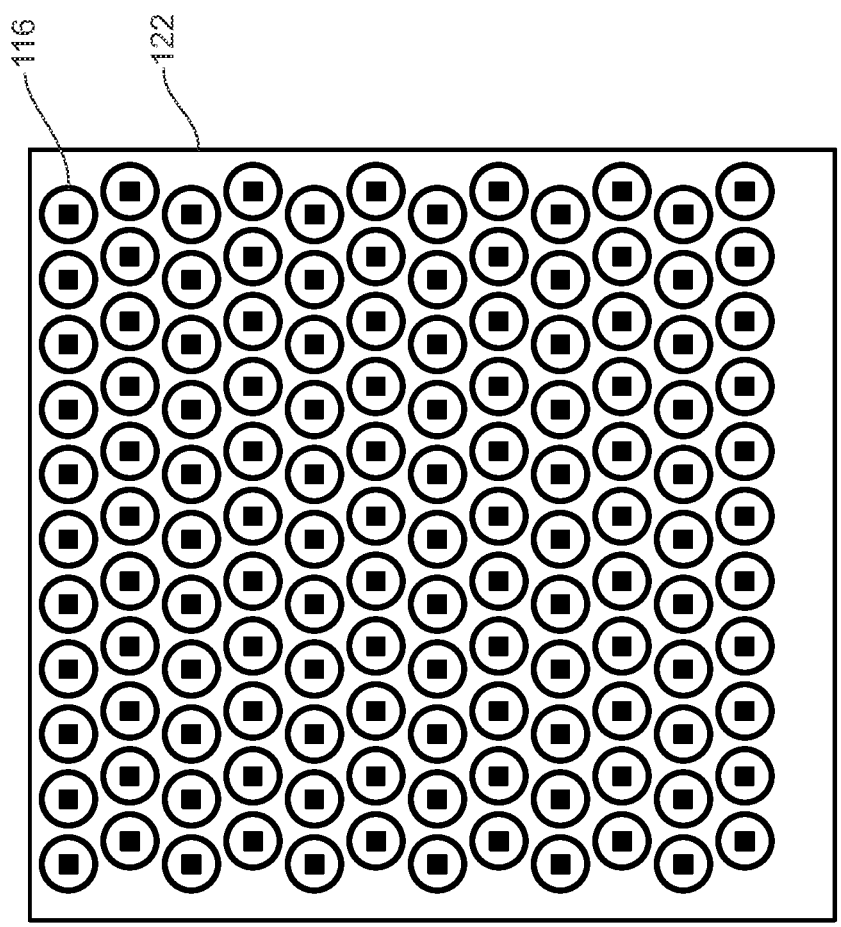
FIG. 21 is a schematic top plan view of a two-dimensional array of point sensors for sensing deformation caused by contact forces, which is used in a system for detecting damage according to an embodiment of the present disclosure.
Figure 22:
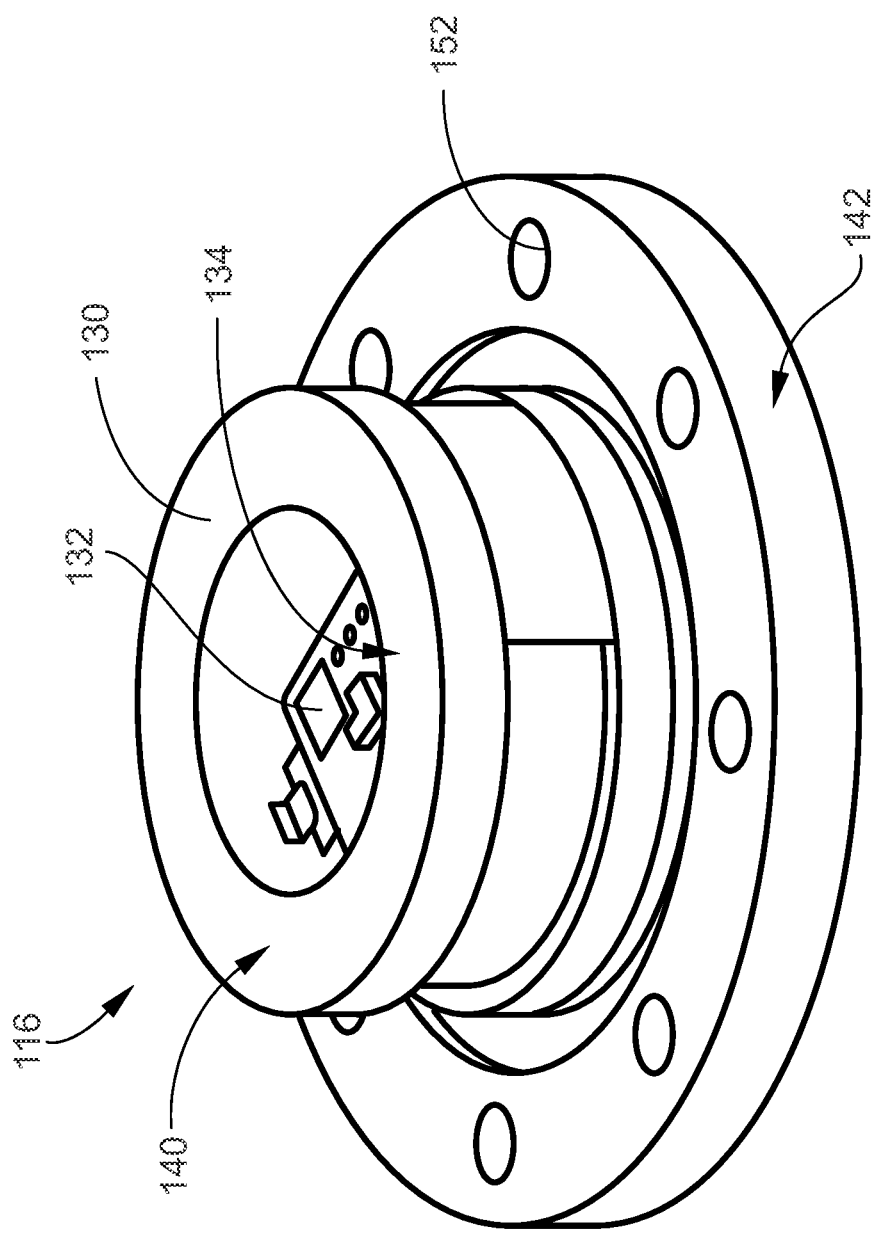
FIG. 22 is a perspective view of an assembled point sensor as shown in FIG. 21.
Figure 24:
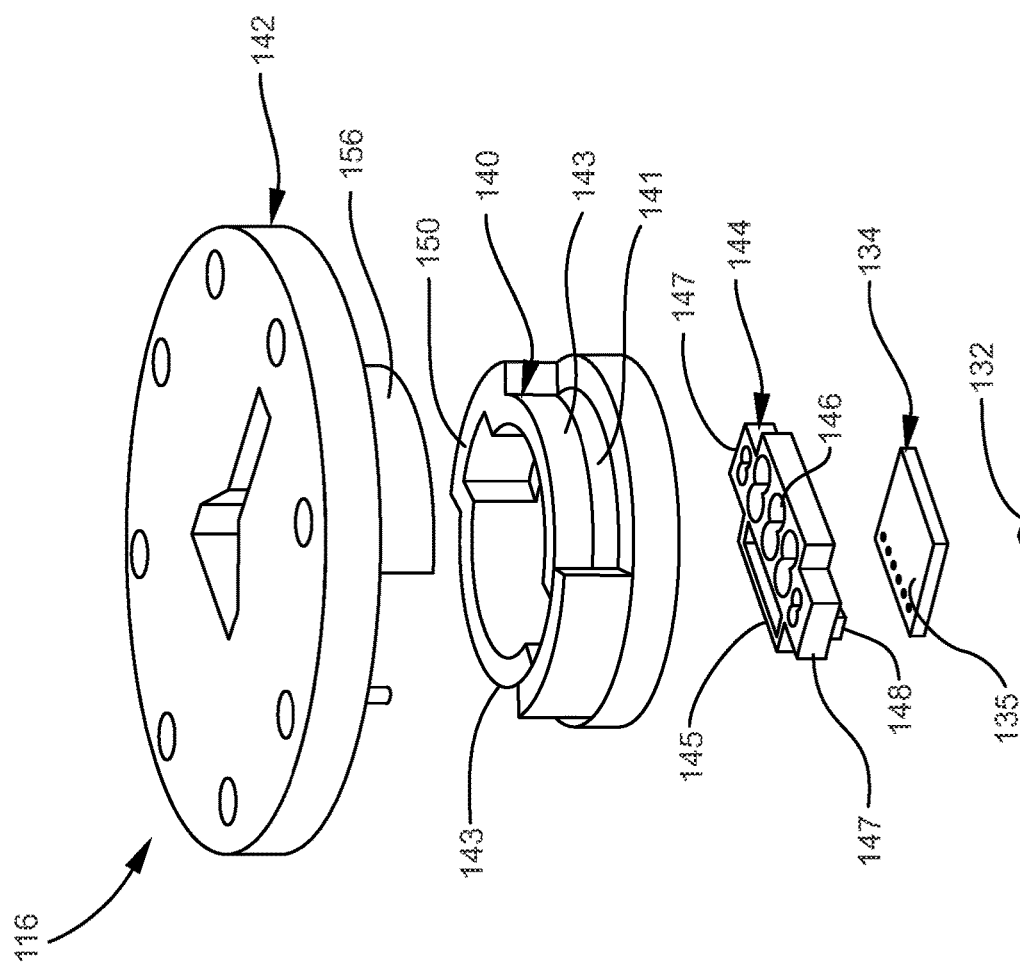
FIG. 24 is an exploded bottom perspective view of the point sensor of FIGS. 22 and 23.

In other embodiments shown in FIG. 21, the system 100 may be a flat panel comprising the plate 122 provided with a two-dimensional array of the sensors 116 in communication with the controller 117 (shown in FIG. 12). In some embodiments, the system 100 employing the array of the sensors 16 may be placed on a steel or aluminum plate 122, although other materials may be used for the plate 122 as desired. In other embodiments, the array of the sensors 116 may be embedded into the plate 122 and have a desired pitch or spatial footprint, for example, 20 mm per sensor. Although the plate 122 may be sized to create a 2-foot by 2-foot panel, for example, other sizes, shapes and dimensions may be employed, if desired. For different applications, the system 100 may employ various dimensions, sizes, number of sensors, and the like, as needed to fulfill requirements of the system 100 as necessary.

It is understood that each of the systems 10, 100 may employ various types of sensors 13, 116 without departing from the scope of the present disclosure. In one embodiment, each of the sensors 116 may be a point sensor configured for non-contact measurement. In other embodiments, each of the sensors 116 may be a proximity sensor.

As illustrated in FIGS. 22-25, the sensor 116 may comprise a sensing area 130, a magnet 132, and a hall-effect device 134. As a non-limiting example, the sensing area 130 may be formed from a generally 3-mm thick S3F polymer portion with the floating magnet 132 embedded generally 1-mm below a surface of the sensing area 130. A three-dimensional, tangential and normal displacement of the magnet 132 may be sensed and monitored using the hall-effect device 134. In some embodiments, the hall-effect device 134 may be configured to permit a flow of electrical current therethrough and includes a printed circuit board (PCB) 135 to sense a change in voltage of the electrical current and generate a signal representative of the displacement of the magnet 132, and thereby deformation caused by the contact forces of the at least one target object. The hall-effect device 134 may have a 16-bit digital output. A displacement resolution of the sensors 126 may be exceed 200 nm. Such improved resolution allows stiffer polymer materials to be used for manufacturing the sensors 116, while still maintaining high sensitivity.

The sensor 16 shown includes a hollow sensor body 140 having the active sensing area 30 attached to a sensor back plate or base 142. The sensor body 140 has a generally cylindrical shape. However, it is understood that the sensor body 140 may have any suitable shape as desired. The sensor body 140 may be configured to receive the magnet 132, the hall-effect device 134, and a retaining element 144 for securing the hall-effect device 134 therein. A pair of arcuate-shaped channels 143 may be formed in an outer surface of the sensor body 140. Each of the channels 143 may be provided with a rib 141 more clearly shown in FIG. 24.

Figure 23:
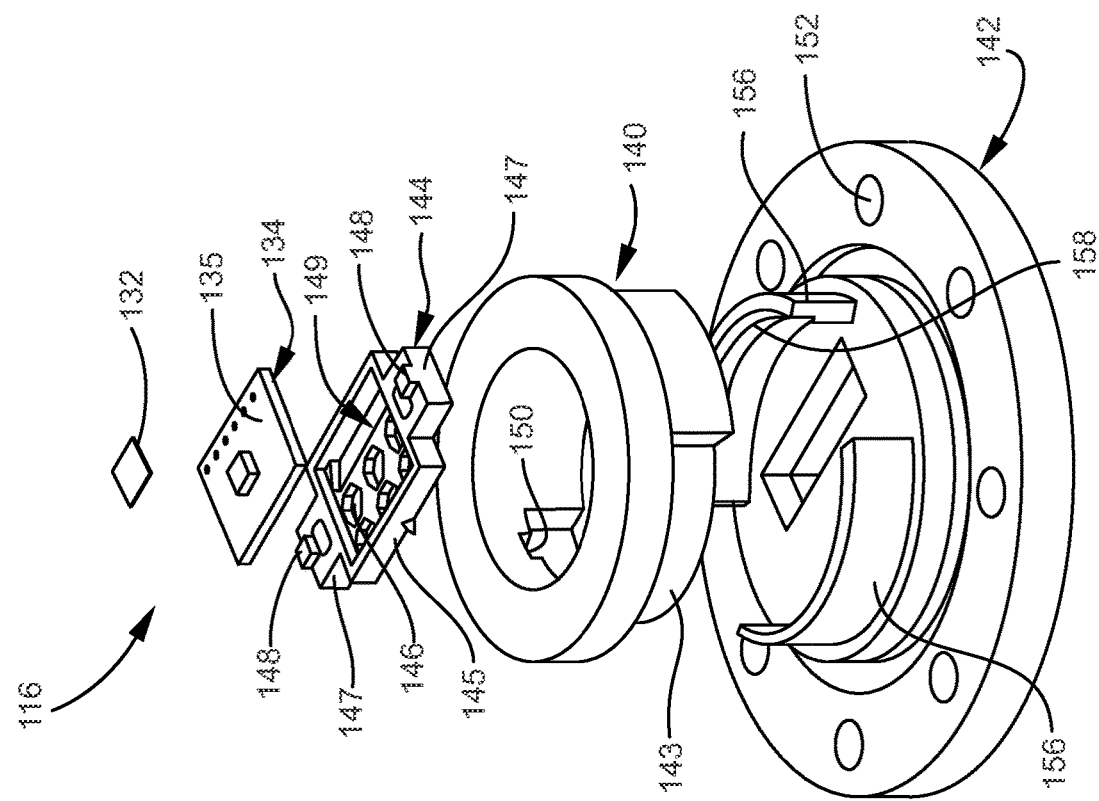
FIG. 23 is an exploded top perspective view of the point sensor of FIG. 22.

As best seen in FIG. 23, the retaining element 144 may include a center portion 145 having a recess 149 for receiving the hall-effect device 134 therein and a pair of opposing ear portions 147 extending outwardly from the center portion 145. A plurality of apertures 146 may be formed in the center portion 145 and/or ear portions 147. A size, shape, and number of the apertures 146 may be as such to permit wiring of the hall-effect device 134 to extend therethrough and/or minimize a weight and cost of the sensor 116. Each of the ear portions 147 of the retaining element 144 may further include a protuberance 148 extending axially therefrom. The ear portions 147 with the protuberances 148 are configured to cooperate with corresponding indentations 150 formed in an inner surface of the sensor body 140 to maintain a position of the retaining element 144 therein.

Figure 25:
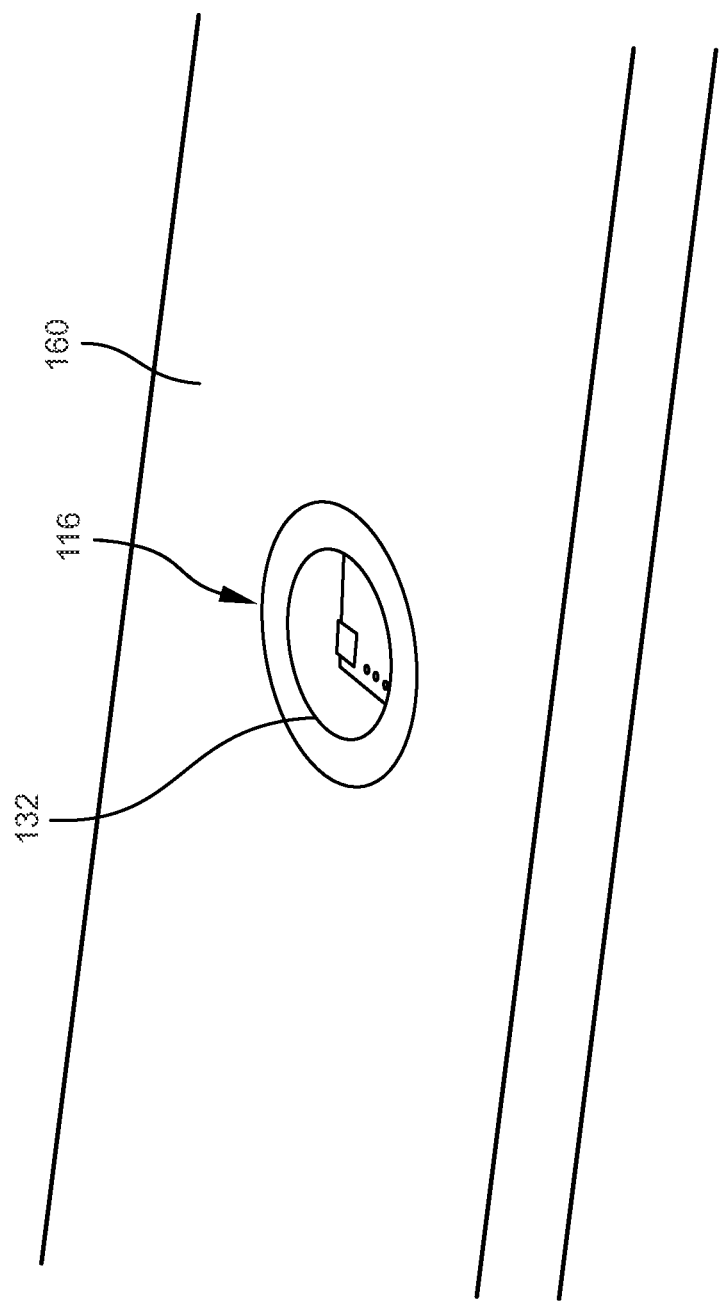
FIG. 25 is a fragmentary perspective view of a flat plate having the point sensor of FIGS. 22-24 disposed therein.

An array of mounting holes 152 may be provided in the base 142 for affixing the sensor 116 to a mounting structure (not depicted). It is understood that the sensor 116 may be installed in a substantially planar plate 160 or other structure as shown in FIG. 25. As illustrated, the sensor 116 may be mounted so that the sensing area 30 is substantially flush with a surrounding surface of the plate 160 or other structure. A wire routing channel 154 may also be formed in the base 142 to route wire supplying the electrical current and/or transmitting the signal to and/or from the sensor 116. The base 142 may further include a pair of opposing arcuate-shaped projections 156. As more clearly shown in FIG. 23, each of the projections 156 may include a channel 158 configured to receive the rib 141 of the sensor body 140 to couple the sensor body 140 to the base 142.

Figures 26, 27:
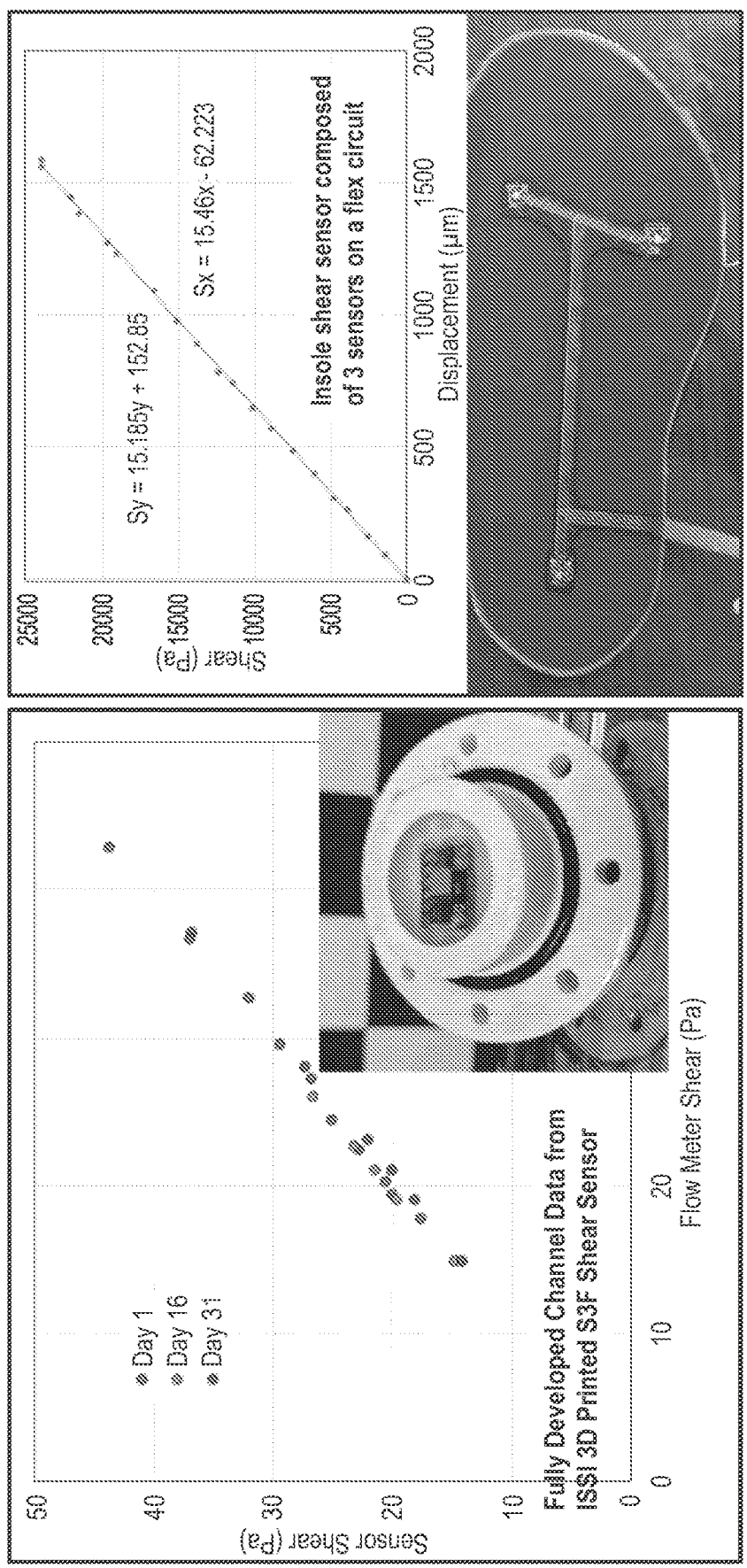
FIG. 26 shows a hydrodynamic point sensor for measuring shear forces for detecting damage according to an embodiment of the present disclosure.
FIG. 27 shows an in-sole shear sensor for measuring shear forces for detecting damage according to an embodiment of the present disclosure.

The system 100 may be used in a variety of applications such as hydrodynamic skin friction and in-sole foot shear. Examples of two such systems are shown in FIGS. 26 and 27.

Such image-based systems 10 and point-based systems 100 may be employed to detect damage in a target object. Advantageously, the systems 10, 100 improve a safety and performance of an aircraft by detecting the type of tire damage that cannot be identified by visual inspection and can lead to catastrophic tire failure on takeoff or landing. The systems 10, 100 and method of use thereof are particularly beneficial in operational settings where close proximity to the tire is prohibited by safety concerns, and therefore, visual inspection is not possible.

In certain embodiments, the systems 10, 100 may be utilized in a depot or an airport runway, ramp, maintenance or hot pit refueling apron to detect damage to the tires. This technology may be utilized to provide real-time assessments of the tire to determine whether a condition of the tire is acceptable for use under rapid sortie generation operations. Data from the systems 10, 100 may also link to inventory, maintenance and databases (e.g. tire databases) for enhanced safety, logistics, and management (e.g. tire maintenance management) via the controllers 14, 117. The systems 10, 100, via the controllers 14, 117 may also be capable of aircraft tire integrity assessment and predictive maintenance, which may offer substantial savings in tire acquisition and disposal costs, as well as improve operational readiness and safety.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method of detecting damage, comprising steps of:
    sensing, via at least one sensor, a shear force as at least one target object traverses a surface, wherein the surface includes the at least one sensor;
    detecting damage to the at least one target object based upon the sensed shear force; and
    comparing the sensed shear force to baseline data associated with an undamaged object.

2. The method according to claim 1, wherein the at least one sensor is a shear force sensor.

3. The method according to claim 1, wherein the at least one target object is a tire.

4. The method according to claim 1, wherein the damage detected includes internal damage and/or external damage to the at least one target object.

5. The method according to claim 1, wherein the at least one sensor is configured to measure a tangential shear force.

6. The method according to claim 1, wherein the baseline data is generated by sensing at least one of axial shear contact force and lateral shear contact force as the undamaged object traverses a surface.

7. The method according to claim 1, wherein the baseline data is generated by sensing an entire circumference of the undamaged object and detecting deviations from a mean.

8. The method according to claim 1, wherein the at least one target object and the undamaged object are tires used in at least one of a human-powered vehicle and a motor-powered vehicle.

9. A system for detecting damage, comprising:
at least one sensor configured to sense a shear force as at least one target object traverses a surface, wherein the surface includes the at least one sensor, and wherein the at least one sensor is configured to generate a signature associated with the at least one target object; and
a controller in communication with the at least one sensor, wherein the controller is configured to analyze the shear force sensed by the at least one sensor to detect damage to the at least one target object, and wherein the controller is configured to compare the signature associated with the at least one target object to a signature associated with an undamaged object.

10. The system according to claim 9, wherein the damage detected includes internal damage and/or external damage to the at least one target object.

11. The system according to claim 9, wherein the signature associated with the at least one target object is representative of the shear force sensed by the at least one sensor.

12. The system according to claim 9, wherein the signature associated with the undamaged object is representative of a baseline shear force as the undamaged object traverses a surface.

13. The system according to claim 9, wherein the at least one target object and the undamaged object are tires used in at least one of a human-powered vehicle and a motor-powered vehicle.

14. A method of detecting tire damage, comprising steps of:
sensing, via at least one sensor, a shear force as at least one tire traverses a surface including the at least one sensor;
comparing the sensed shear force to baseline data; and
detecting damage to the at least one tire based upon the comparison of the sensed shear force to the baseline data.

15. The method according to claim 14, wherein the baseline data is generated by sensing at least one of axial shear contact force and lateral shear contact force of an undamaged tire.

16. The method according to claim 14, wherein the baseline data is generated by sensing an entire circumference of an undamaged tire and detecting deviations from a mean.

17. The method according to claim 14, wherein the baseline data is generated by sensing a baseline shear force of a collection of tires used in at least one of a human-powered vehicle and a motor-powered vehicle.

* * * * *